(12) United States Patent  
Tadayon et al.

(10) Patent No.: US 8,266,067 B1  
(45) Date of Patent: *Sep. 11, 2012

(54) METHOD AND SYSTEM FOR AUTOMATIC SCORING OF THE INTELLECTUAL PROPERTIES

(75) Inventors: Saied Tadayon, Potomac, MD (US); Bijan Tadayon, Potomac, MD (US); Mahin Tehrani, Potomac, MD (US)

(73) Assignees: Bijan Tadayon, Potomac, MD (US); Saied Tadayon, Potomac, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,387

(22) Filed: Mar. 25, 2012

Related U.S. Application Data

(63) Continuation of application No. 13/115,114, filed on May 25, 2011, now Pat. No. 8,150,777.

(51) Int. Cl.
*G06Q 50/00* (2006.01)
(52) U.S. Cl. ................ 705/310; 705/1; 705/31
(58) Field of Classification Search ............... 705/1, 37, 705/310
See application file for complete search history.

(56) References Cited

U.S. PATENT DOCUMENTS

| | | | |
|---|---|---|---|
| 6,330,547 B1 * | 12/2001 | Martin | 705/38 |
| 6,968,339 B1 * | 11/2005 | Stephens | 1/1 |
| 2002/0178029 A1 * | 11/2002 | Nutter et al. | 705/1 |
| 2005/0261927 A1 * | 11/2005 | Bilak et al. | 705/1 |
| 2006/0085219 A1 * | 4/2006 | Frank et al. | 705/1 |
| 2007/0016431 A1 * | 1/2007 | Desai et al. | 705/1 |
| 2007/0073625 A1 * | 3/2007 | Shelton | 705/59 |
| 2008/0313001 A1 * | 12/2008 | Marko et al. | 705/8 |
| 2010/0262530 A1 * | 10/2010 | Malackowski et al. | 705/37 |
| 2011/0078036 A1 * | 3/2011 | Cummings et al. | 705/26.3 |
| 2011/0246379 A1 * | 10/2011 | Maddox et al. | 705/310 |

* cited by examiner

*Primary Examiner* — Scott Zare
*Assistant Examiner* — Talia Crawley
(74) *Attorney, Agent, or Firm* — Bijan Tadayon; Saied Tadayon

(57) ABSTRACT

Novel methods of IP or patent management and monetization based on IP/patent pooling and scoring systems are disclosed. In addition, novel partnership methods with IP producing entities (such as universities) are disclosed which produce incentives and efficiencies far and above other methods. Systems and methods are disclosed for valuation of IP instruments and distribution of IP revenue/proceeds. Examples of methods for scoring IP instruments, using a transactional and event driven point/value system, are disclosed for tracking, monitoring, distribution and allocation of proceeds in a complex pooling arrangement of IP instruments.

20 Claims, 23 Drawing Sheets

US 8,266,067 B1

METHOD AND SYSTEM FOR AUTOMATIC SCORING OF THE INTELLECTUAL PROPERTIES

RELATED APPLICATION

This application is the continuation of another U.S. application Ser. No. 13/115,114, filed May 25, 2011 now U.S. Pat. No. 8,150,777, by the same inventors and for the same assignee, now allowed. The current application incorporates by reference all the teachings and spec of the parent application, and the current application claims benefit of the priority date of the parent application.

BACKGROUND OF THE INVENTION

Intellectual Properties (IP, e.g. patents) are very important tools for any company to protect their research or investment money. Different IP management, insurance, or monetization models are used by other companies, e.g. IPISC, R. J. Ahmann, Allied Security Trust, Acacia Research, Forgent Networks, TechSearch, Eolas Technology, Mercexchange, Ocean Tomo, RPX, AbsolutelyNew Inc., and Intellectual Ventures.

SUMMARY OF THE INVENTION

We use new methods of IP management and monetization based on patent pooling and scoring systems, as described below, which are very different from all the methods used before. In addition, other methods for partnership between different entities (such as with universities) are also presented here, to produce incentives for all parties involved. Different variations are presented. Different analytical models, tools, and methods are also presented.

DETAILED DESCRIPTION OF THE PREFERRED EMBODIMENTS

Figure 1:
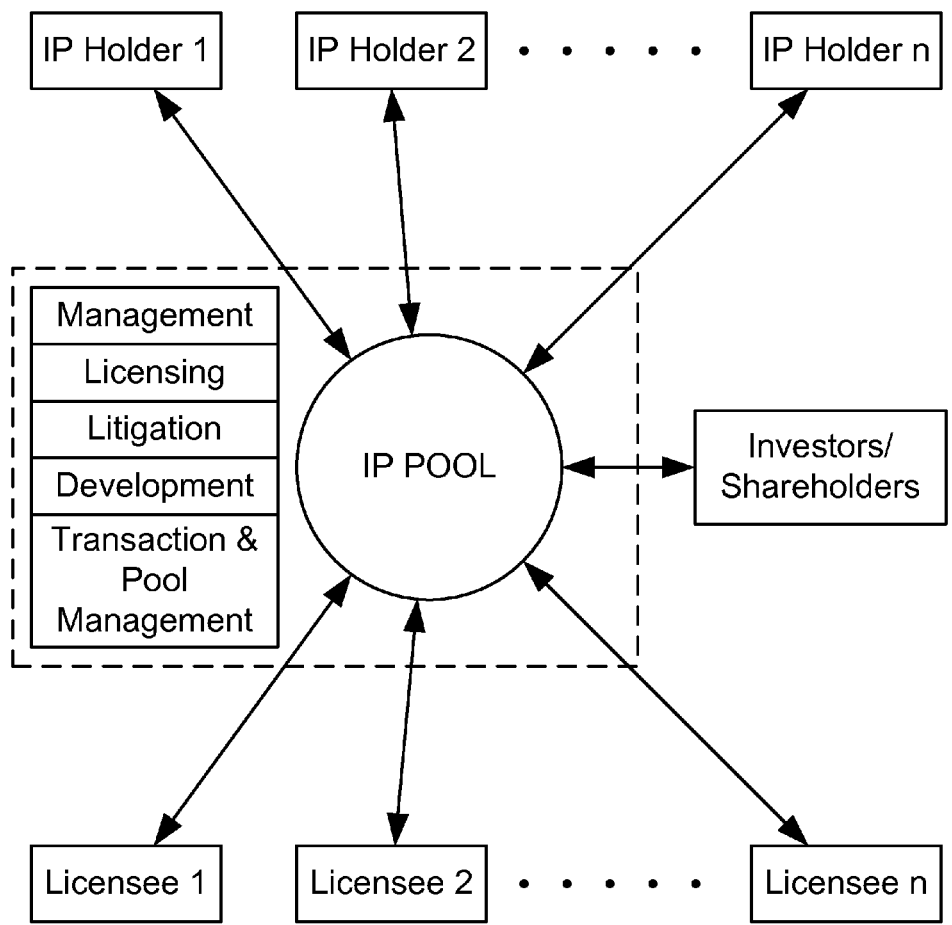
FIG. 1 demonstrates an IP Pool management in relation with IP Holders and Licensees, in an embodiment of this invention.

In one embodiment of this invention, as for example depicted in FIG. 1, an intellectual property (IP) Pool is setup and managed to facilitate the licensing of intellectual property instruments between IP holders and licensees. In one embodiment, the cost of management of IP instruments (such as patent applications and patents) is reduced by managing, enforcing, and licensing IP under a pool. For example, a licensee may license one, multiple, or the whole pool. In one embodiment, the revenue generated by IP licensing fee, damage recovery from litigation, settlement proceeds, or royalties is used for various costs associated to IP pool management, development (e.g., development of the initial disclosure, filing and prosecution), litigation, licensing/marketing efforts, profit share of investors, reinvesting in purchasing IP, allocation of profits/contract proceeds to IP holders/lessors/assignors beneficiaries.

Figure 2:
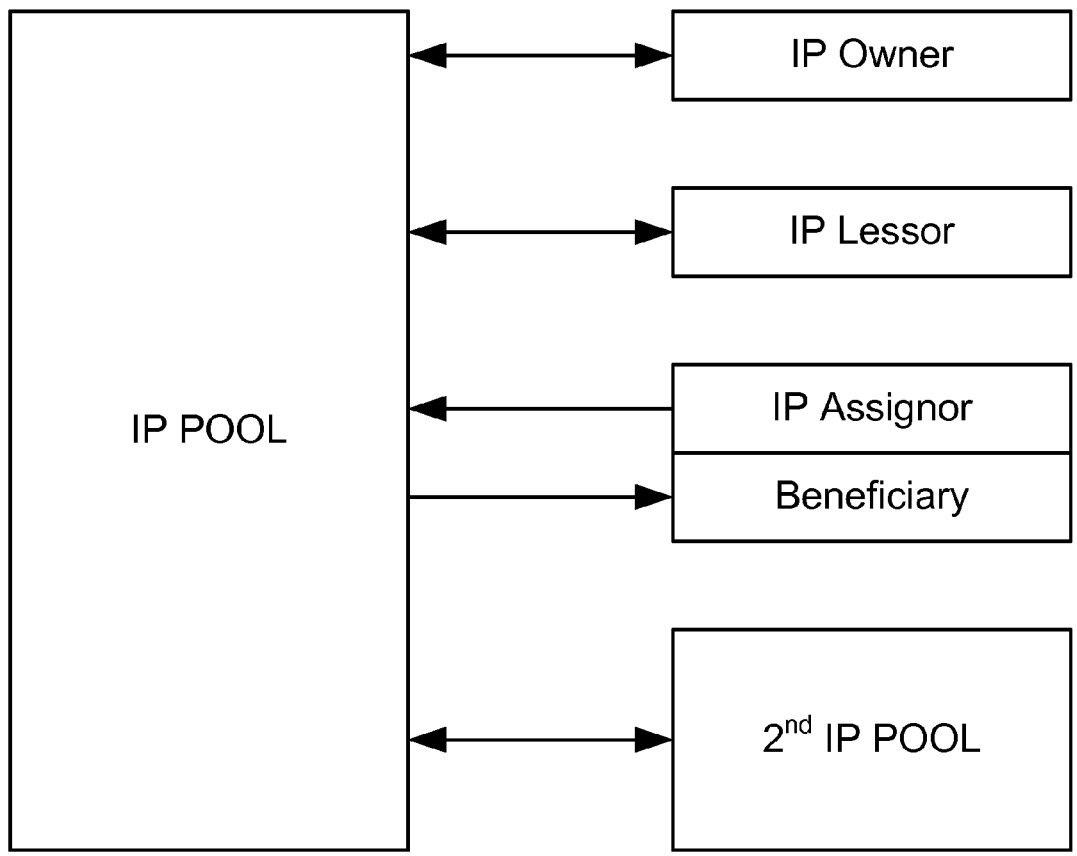
FIG. 2 depicts IP pool supply side, in an embodiment of this invention.

In one embodiment, as for example depicted in FIG. 2, one or more IP rights are given to the pool by an IP Owner. In one embodiment, such rights include right to sue for infringement (standing), right to license or sub-license IP, right to sell IP (for example if an offer meeting a minimum requirement is met or approval is obtained). In one embodiment, IP instrument is leased to the pool, for a period of time or for a duration terminated by a condition (e.g., contractual) or event(s). In one embodiment, the pool management has an option to extend the lease. In one embodiment, the IP lessor or owner may reclaim the rights or IP under contractual conditions such as if the IP has not generated an income over certain amount for a certain period of time. In one embodiment, such a IP rights reversal is contingent upon IP owner or lessor pay the cumulated cost associated to the IP instruments (such as prosecution cost) as well as a pool extraction fee. In one embodiment, IP addition to the pool is final and not reversible, but for the pool management approval. In one embodiment, an IP is assigned to the pool by an IP assignor, e.g., by assigning all the IP rights to the pool management. In such an embodiment, either the assignor(s) or its (their) designated beneficiary(ies) receive the distribution from the pool or per IP instrument. In one embodiment, one or more IP rights are obtained from a $2^{nd}$ IP pool, e.g., via a purchase, lease, contract, or assignment, for getting lump sum, periodic or event-based distribution/bonus, or cross licensing privilege.

In one embodiment, an inclusion of an IP instrument in the IP pool is contingent upon future inclusion into the pool of an IP associated with Continuation application/patent (with or without terminal disclaimer) and/or Continuation-In-Part (CIP) application/patent of the original IP instrument. In one embodiment, additional patent applications/patents with very similar claims to existing pool applications/patent are filtered for invalidity before entering the pool. In one embodiment, a CIP is counted as a separate patent application/patent for the purposes of counting in the pool.

Figure 3:
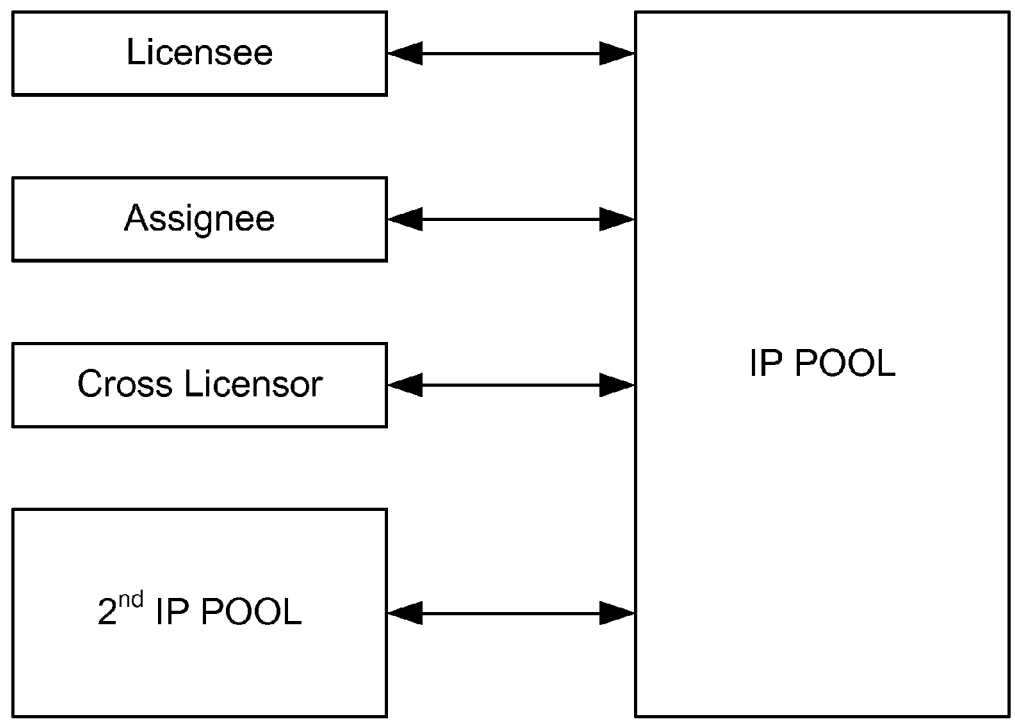
FIG. 3 depicts IP demand side, in an embodiment of this invention.

In one embodiment, as for example depicted in FIG. 3, one or multiple IP instrument, or whole IP pool is licensed (exclusive or non-exclusive) to one or more licensees, assigned to one or more assignees, cross licensed to one or more licensors, licensed or assigned to a $2^{nd}$ IP pool, sold, leased, or co-assigned. Licenses (or leases) may be for limited time or effective upon a condition. Licenses or their terms may be confidential. Licenses may be for one, more, or all the rights associated with one or multiple IP instruments or the IP pool. In one embodiment, the revenue from licensing includes royalties, settlement proceeds, licensing fees, and other forms of value, such as equity, options, stock, and/or cross license of other IP instrument(s).

Figure 4:
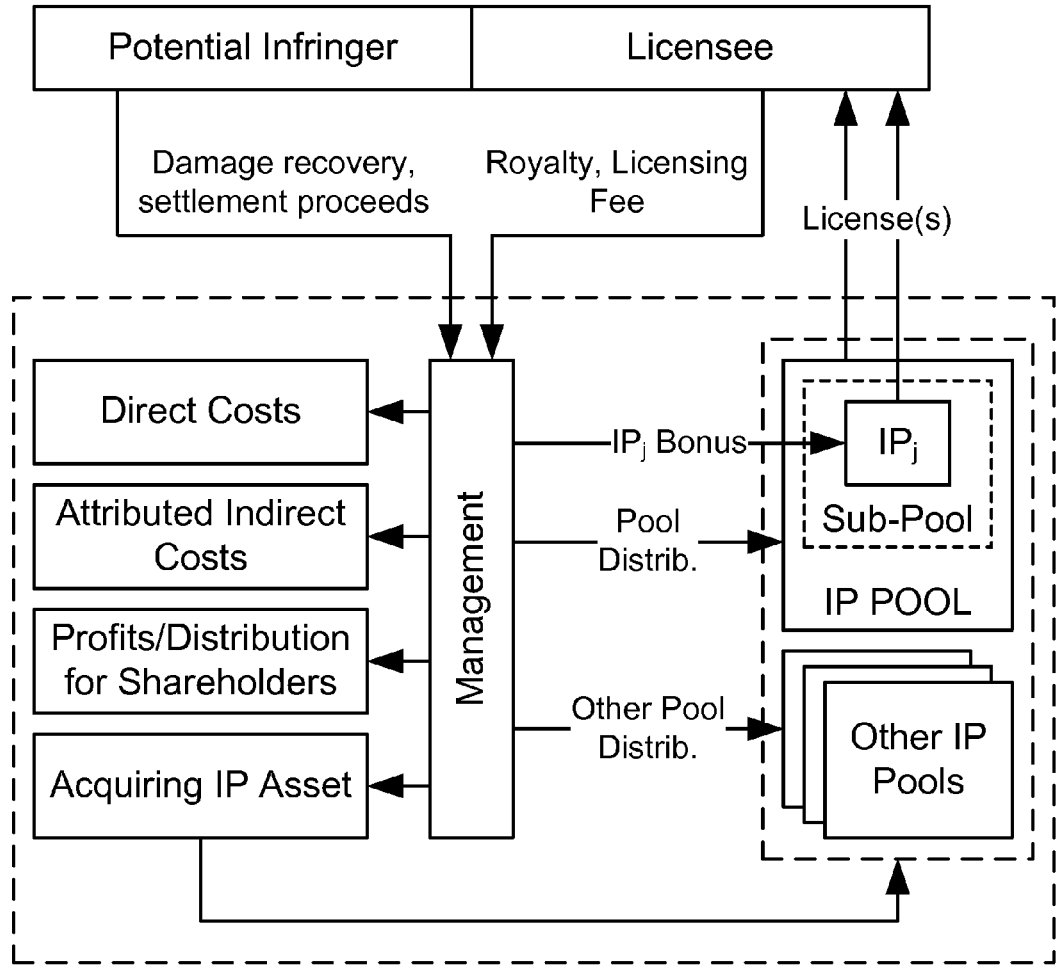
FIG. 4 demonstrates management of IP Pool(s) and allocation of attributed profit to IP instrument(s) or pool, in an embodiment of this invention.

In one embodiment, as for example depicted in FIG. 4, royalty or licensing fee is obtained from licensees and/or settlement proceeds or damage recovery is obtained from an infringer or potential infringer, by e.g., the pool management. In one embodiment, direct costs associated with these generated revenue are subtracted, as well as attributed indirect costs. In one embodiment, share of profits for shareholders are calculated as a percentage of profit (after subtracting direct and indirect costs). In one embodiment, the distribution to the shareholders is calculated as a percentage of gross revenue or net income. In one embodiment, a portion of revenue or profit is used or allocated for acquiring IP assets, e.g., to create, supplement or grow IP pool(s). In some embodiments, a portion of revenue or profit is allocated for distribution toward IP instruments, IP sub-pool(s), and/or IP pool(s). In some embodiments, a bonus distribution is allocated for $IP_j$ (denoting e.g., the $j^{th}$ IP instrument in the IP pool), where the bonus is related to the revenue attributed to $IP_j$ (for example, from a damage recovery or settlement proceeds related to $IP_j$ or licensing fee or royalty associated with $IP_j$). In one embodiment, such a bonus is used to specifically reward IP instruments that were involved specifically in generating revenue beyond all other IP instruments in the pool. In one embodiment, when a subset of IP instruments in the pool is involved in generating revenue, such bonus is allocated to that subset, which may be in form of a sub-pool (or a logical sub-pool). In some embodiments, a portion of generated revenue or profit is allocated or distributed to the IP pool itself. In one embodiment, such distribution to the IP pool rewards IP instruments in the pool for being in the pool, even if an IP instrument has not itself been involved in generating specific revenue or profit or any revenue or profit at all, e.g., through licensing or litigation. In one embodiment, license(s) is granted to a licensee(s) from specific $IP_j$ involved in licensing, negotiation, or litigation. In one embodiment, license is granted to licensee(s) covering IP instruments in the pool, i.e., the IP pool itself is licensed to the licensee(s). In one embodiment, a licensing combination of specific IP instrument, IP sub-pool, and/or IP pool is used. For example, the terms of the license for each part may be different in its coverage for use, sale, make, and/or import, volume, geographic locations, sub-licensing rights, time periods, events, contractual restrictions, consideration (e.g., royalty rate, amount, lump sum payment and installment plan, and rights such as cross licensing), options to extend the terms of license, exclusivity and non-exclusivity, and/or confidentiality terms. In one embodiment, when an infringer or a potential infringer is given license, then such entity also becomes a licensee for the purposes of these discussions.

In one embodiment, a portion of revenue or profit allocated as a bonus to $IP_j$ is based on a percentage of the revenue or profit, e.g., after subtracting direct and attributed indirect costs from revenue generated related to $IP_j$. For example, in such an embodiment, when $IP_j$ is a patent asserted in litigation or it is a specific intellectual property for which a license is sought, the revenue or profit generated is used to allocate a bonus to $IP_j$.

Figure 5:
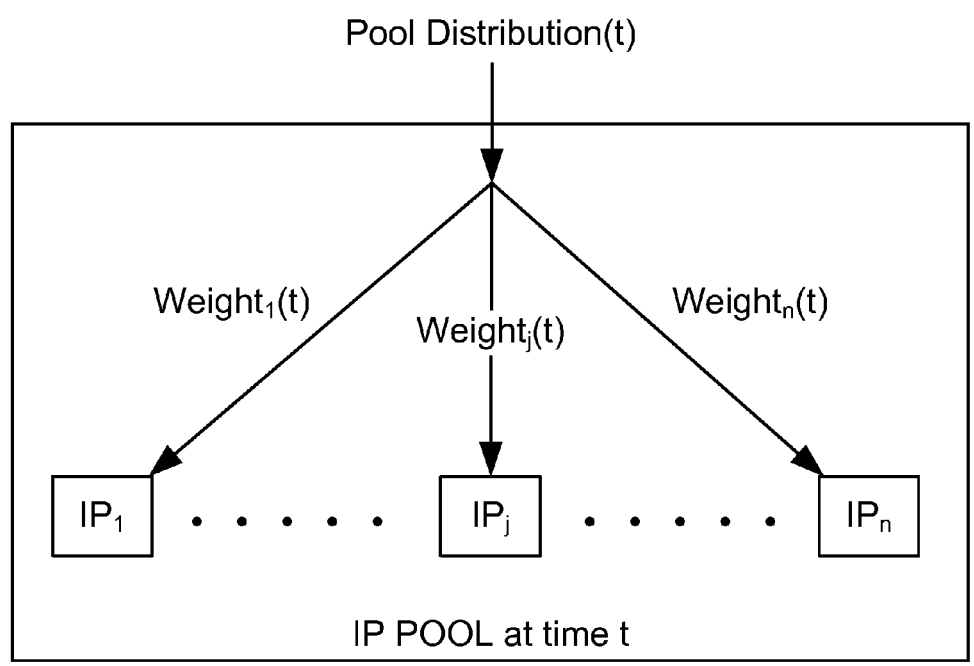
FIG. 5 depicts a particular distribution/allocation done at time t on IP instruments in an IP pool based on their corresponding weights, in an embodiment of this invention.

In one embodiment, for example as depicted in FIG. 5, a distribution allocated to an IP pool at a given time (t) is allocated to individual IP instruments (e.g., denoted as $IP_1, \ldots, IP_j, \ldots, IP_n$ in the pool), based on their corresponding weight (e.g., relative weight, value or points in a point system), denoted as $Weight_1, \ldots, Weight_j, \ldots, Weight_n$. In one embodiment, various factors, events, conditions, and time may change these weights, e.g., effective when such events occur, effective at set intervals or periods or durations, or effective with a time offset. Accordingly, such weights may be time dependant in an embodiment. In one embodiment, the weights are fixed for a duration of time, e.g., based on contractual agreements. In one embodiment, the distribution per individual IP instrument is calculated based on a relative weight as follows:

$$\text{Distribution}_{j,pool}(t) = \text{Distribution}_{pool}(t) \cdot \frac{\text{Weight}_j(t)}{\sum_{i=1}^{n} \text{Weight}_i(t)}$$

In one embodiment, the distribution per IP instrument in the pool is based on a discrete levels, steps, or class category. In an embodiment, for example, the weights are associated with the levels/steps/categories $L_q$, for q from 1 to m, where m is the number of levels/steps/categories. For example, in one embodiment, where L is a function denoting the level/step/category of a given IP instrument, and $W_t$ is a function denoting the weight associated with a given level/step/category at a given time t, the pool distribution per IP instrument may be derived by:

$$\text{Distribution}_{j,pool}(t) = \text{Distribution}_{pool}(t) \cdot \frac{W_t(L(IP_j))}{\sum_{i=1}^{n} W_t(L(IP_i))}$$

In terms of level/step/category, the distribution per $IP_j$ is derived as:

$$\text{Distribution}_{j,pool}(t) = \text{Distribution}_{pool}(t) \cdot \frac{W_t(L_k(t))}{\sum_{q=1}^{m} W_t(L_q) \cdot n_q(t)}$$

Where $L_k$ is the level/step/category associated with $IP_j$ at effective time t, i.e., $L_k = L(IP_j)$, and $n_q$ is the number of IP instruments at level/step/category $L_q$ at effective time t.

In one embodiment, $W_t$ function is expressed or maintained in form of a functional table for a given level/step/category.

Figure 6:
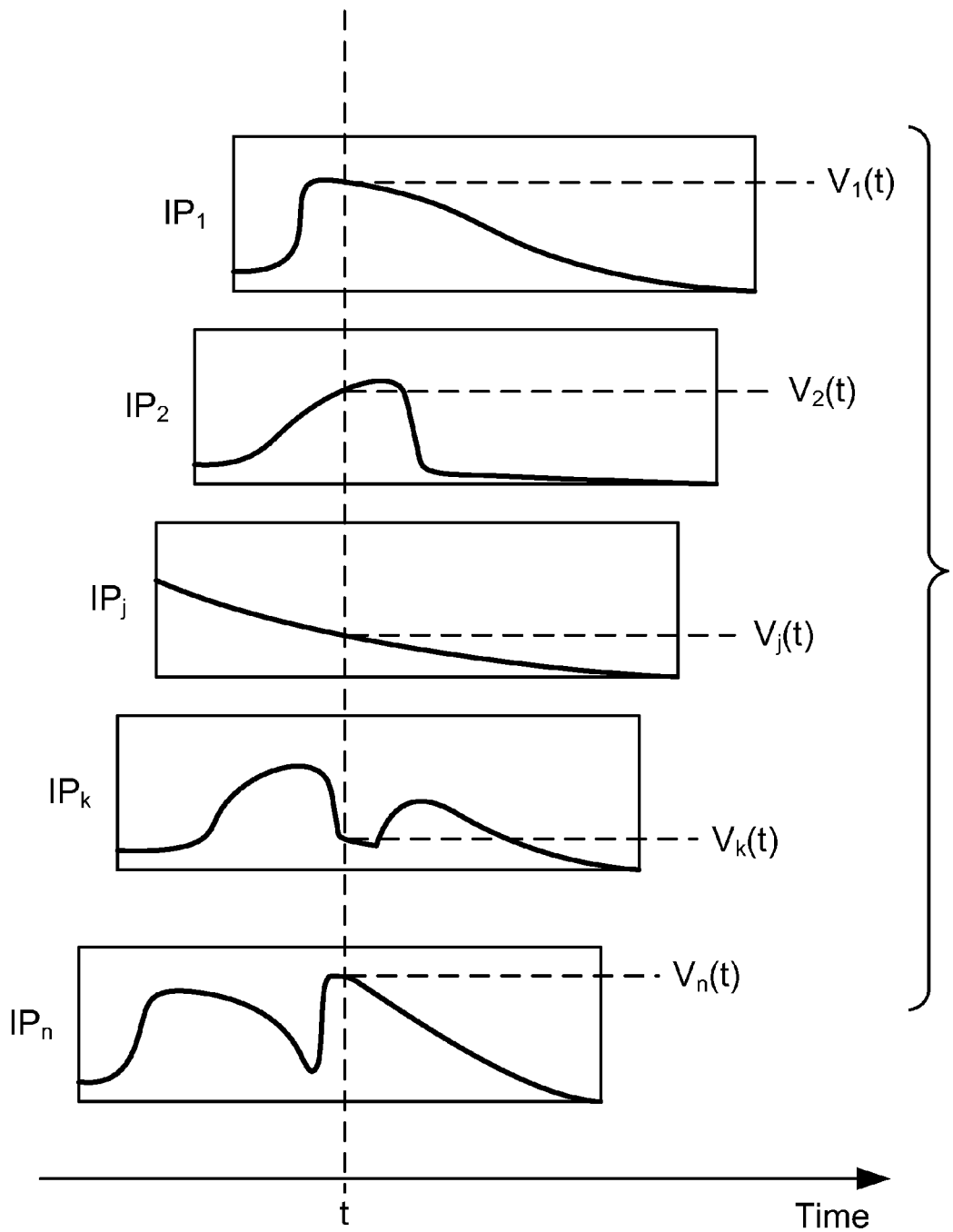
FIG. 6 depicts assessed values of individual IP instruments based on initial conditions, value models, other transactional or legal events, at a given time t, in an embodiment of this invention.

In one embodiment, the weight associated with an IP instrument is determined by a time based value model associated with the IP instrument. In one embodiment, as depicted in FIG. 6, one, more, or all IP instruments in a pool or sub-pool are associated with a value model. For example, in an embodiment depicted in FIG. 6, in the value model graphically associated with $IP_1$, the value initially is low as $IP_1$ is in an application stage, and the value rises quickly as the patent is issued. The value gradually falls as the patent expiration draws near and/or enforcement period shrinks. At an effective time t, the model assesses the value associated $IP_1$ with to be $V_1(t)$ as depicted in FIG. 6. The model associated with $IP_2$ predicts/assumes a sharp decrease in the value, e.g., due to a successful invalidity challenge to the patent claims. The model associated with $IP_j$ demonstrates a steady reduction in the value of $IP_j$, e.g., due to shrinking termination of the enforceability of the patent close or past its expiration date for example based on a statute of limitation. The model associated with $IP_k$ demonstrates a reduction in the value of $IP_k$, e.g., due to a reexamination proceeding which canceled some claims and/or amended some claims. An increase in the value is indicative of, for example, licensing opportunity or potential litigation proceeds based on the amended claims. The model associated with $IP_n$ demonstrates a reduction in the value of $IP_n$, e.g., due to a rejection at the United States Patent and Trademark Office (USPTO) at the reexamination proceeding, followed by an increased in the value, e.g., due to a successful appeal reinstating and validating the claims. Immunizing effect on the patent after a successful reexamination proceeding validating the claims and/or successful patent litigation validating the claims, and/or obtaining reliable opinion validating the patent, may increase the value of $IP_n$ even more significantly compared to absence of such proceedings. In one embodiment, as depicted in FIG. 6, a set of corresponding values (denoted as $V_1(t), V_2(t), V_j(t), V_k(t),$ and $V_n(t)$) is obtained from time based value models corresponding to or associated with $IP_1, IP_2, IP_j, IP_k,$ and $IP_n$, respectfully. These assessed values are used to determine the weights for allocation of pool distribution among its IP instruments. For example, in one embodiment:

$$\text{Distribution}_{j,pool}(t) = \text{Distribution}_{pool}(t) \cdot \frac{V_j(t)}{\sum_{i=1}^{n} V_i(t)}$$

Figure 7:
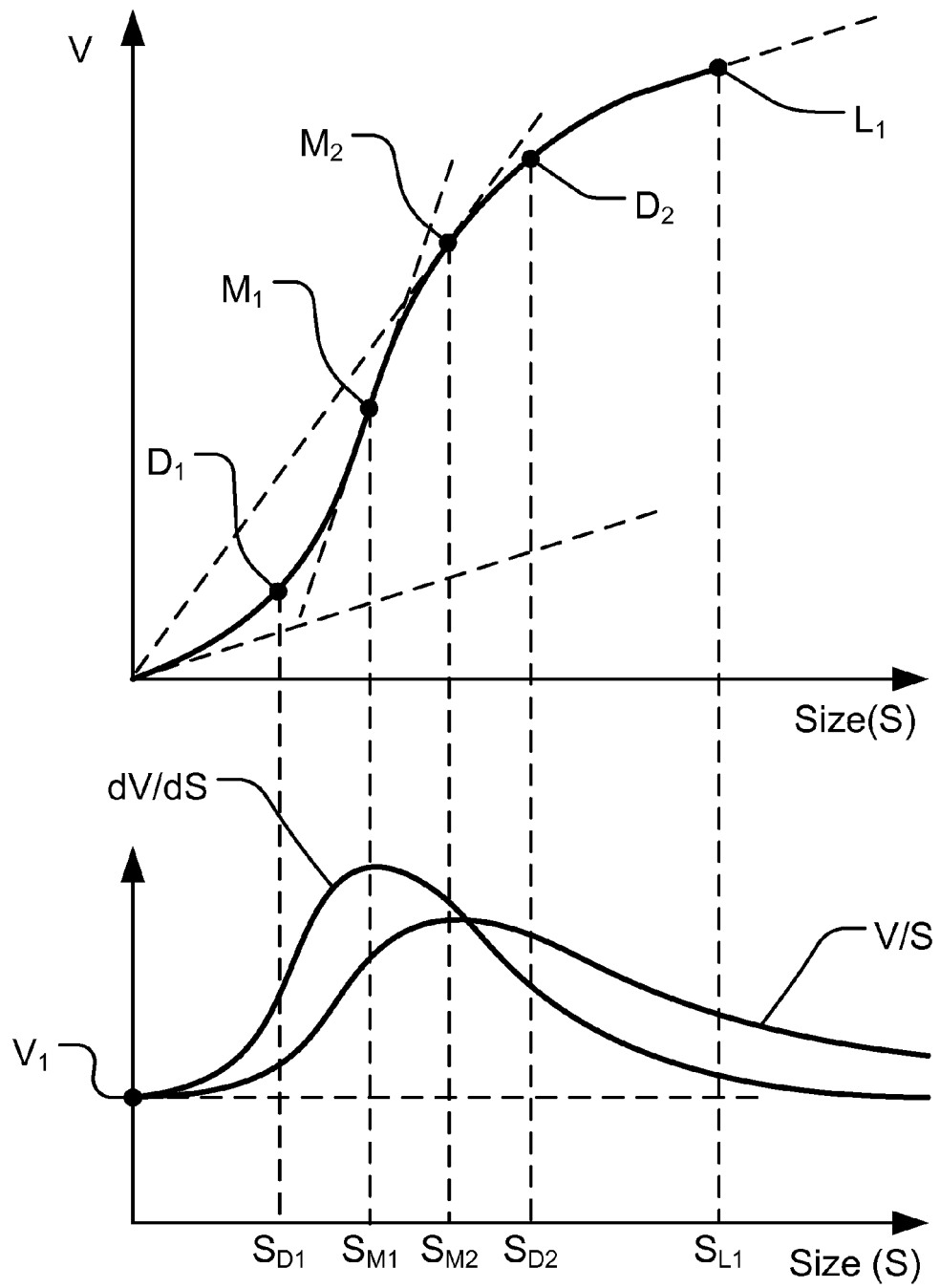
FIG. 7 depicts a typical value of the IP Pool dependence of the size of the Pool, as well as incremental value of the pool per additional IP instrument added to the pool and the average value of the pool per IP instrument, in an embodiment of this invention.

In one embodiment, the value models include the pool effect. As depicted in FIG. 7, in one embodiment, the value of the pool generally follows the curve V(S). To demonstrate an embodiment, for an example, assume that the value of individual IP instrument to be the same ($V_1$) at a given time as separate IP instruments. As the size of the pool increases (e.g., by increasing the number of IP instruments), the value of the pool, V, starts to increase proportionally, for example, with dV/dS or V/S having the value $V_1$. In one embodiment, V1 is the average value of the IP instruments in the pool, but treated as separate IP instruments (i.e., not being treated as part of the pool). dV/dS is the derivative of pool value (V) with respect to the size (S), indicating the incremental pool value at a given pool size. V/S is the average pool value per IP instrument at a given pool size. In one embodiment, as the pool size increases, a synergetic pool effect occurs to increase the value of the IP pool beyond the linear constant growth rate. In one embodiment, the increased coverage of the scope in a field or technical area of the pool makes the pool more attractive and valuable for investors or licensees interested in that field. For example, the incremental value of the pool peaks at $M_1$ corresponding to the maximum tangential slope of V(S), a deflection point of V(S), peak of dV/dS, or zero crossing of $d^2V/dS^2$. In one embodiment, as the size of the pool increases further, the synergetic incremental value becomes less significant, and incremental value to the pool will be close to the value of the added IP instrument taken separately. In an embodiment, the incremental value of the pool when growing beyond a size (e.g., point $L_1$, size $S_{L1}$), is substantially constant and/or equal to the average value of IP instrument added to the pool, but taken separately. In one embodiment, deflection points of dV/dS (i.e., $D_1$ and $D_2$) are indicative of the synergic pool effect. In one embodiment, $D_1$ may be taken as the indicative of the critical size/mass of the pool for realizing the synergetic pool effect in increasing the value of the pool. In one embodiment, $D_2$ may indicate a point where the scopes of some patent claims partially overlap. In one embodiment, average pool value per IP instrument (V/S) peaks a point $M_2$ which corresponds to a larger pool size $SM_2$ than $SM_1$ (size of the pool at peak of dV/dS). In one embodiment, the average pool value per IP instrument becomes higher than the incremental pool value (dV/dS) at larger pool sizes, due to further diminishing synergetic effect.

In one embodiment, the boosting or pool effect on the value of the pool, as its size increases, is reflected uniformly on the value models for individual IP instruments. In one such embodiment, the boosting effect of the pool does not impact the pool distribution among its IP instruments. In one embodiment, the pool boosting effect is calculated as the pool value boosting factor, $\gamma$:

$$\gamma = \frac{V}{S \cdot V_1}$$

In one embodiment, the boosting effect on the pool value is not uniformly applied to the value models of individual IP instruments within the pool. For example, in one embodiment, the claim scope coverage is used as one factor to attribute the pool boosting effect on individual IP instruments or sets of IP instruments. In one embodiment, a coverage factor is assigned based on the existing claim(s) in an IP instrument. In one embodiment, a coverage factor is assigned based on the scope and inventions thought in the specification/drawings/claims of an IP instrument. In one embodiment, a coverage factor is adjusted based on whether a pending application exists to enable filing additional claims based on the same or other inventions thought within an IP instrument (or a parent application). In one embodiment, the coverage factor may be adjusted based on events or transactions, e.g., court determinations/orders, prosecution history, and/or market search/evaluation. In one embodiment, the coverage factors ($C_i$) are relative weights among IP instruments in a pool or sub-pool. In one embodiment, the pool boosting factor per individual IP instrument ($\gamma_i$) is related to the pool boosting factor as:

$$\gamma = \frac{\sum_{i=1}^{n} \gamma_i \cdot V_i}{\sum_{i=1}^{n} V_i}$$

$$\gamma_i = \Gamma_i(C_i)$$

Where $\Gamma_i$ is a functional dependency of the pool boosting factor per individual IP instrument ($\gamma_i$) on the coverage factor weight of the IP instrument ($C_i$).

In one embodiment, $\Gamma_i$ is taken as a identity operator, i.e., $$\gamma_i = C_i$$

In one embodiment, the distribution per IP instrument is calculated as:

$$\text{Distribution}_{j,pool}(t) = \text{Distribution}_{pool}(t) \cdot \frac{\gamma_j(t) \cdot V_j(t)}{\sum_{i=1}^{n} \gamma_i(t) \cdot V_i(t)}$$

or $$\text{Distribution}_{j,pool}(t) = \text{Distribution}_{pool}(t) \cdot \frac{\gamma_j(t) \cdot V_j(t)}{V_{Pool}(t)}$$

In one embodiment, the coverage factors may be assigned based on a discrete scale, levels, or categories. For example, categories such as very narrow, narrow, narrow-medium, medium, medium-broad, broad, and/or very broad or equivalents are defined, and correspondences are made between such categories and individual IP instruments or sub-pools. In one embodiment, the pool boosting factor for individual IP instrument is based on the IP instruments membership in such scale, levels, or categories. In one embodiment, each category/level/scale is associated with a weight factor (which may be adjusted time to time), identifying the pool boosting effect associated with a given level/category/scale. In one embodiment, the pool distribution for an IP instrument is determined by:

$$\text{Distribution}_{j,pool}(t) = \text{Distribution}_{pool}(t) \cdot \frac{\Gamma_t(LV_k(t)) \cdot V_j(t)}{V_{Pool}(t)}$$

where $LV_k$ is the level/category/scale associated with the scope of IP instrument $IP_j$. And $\Gamma_t()$ is a function/table returning the boosting factor associated with a level, such as $LV_k$, at a given effective time t.

In one embodiment, such membership is based on membership in fuzzy sets. In one embodiment, the pool boosting factor for individual IP instrument is based on the membership factors of the IP instruments in fuzzy sets/categories describing the scope of the IP instrument.

Figure 8:
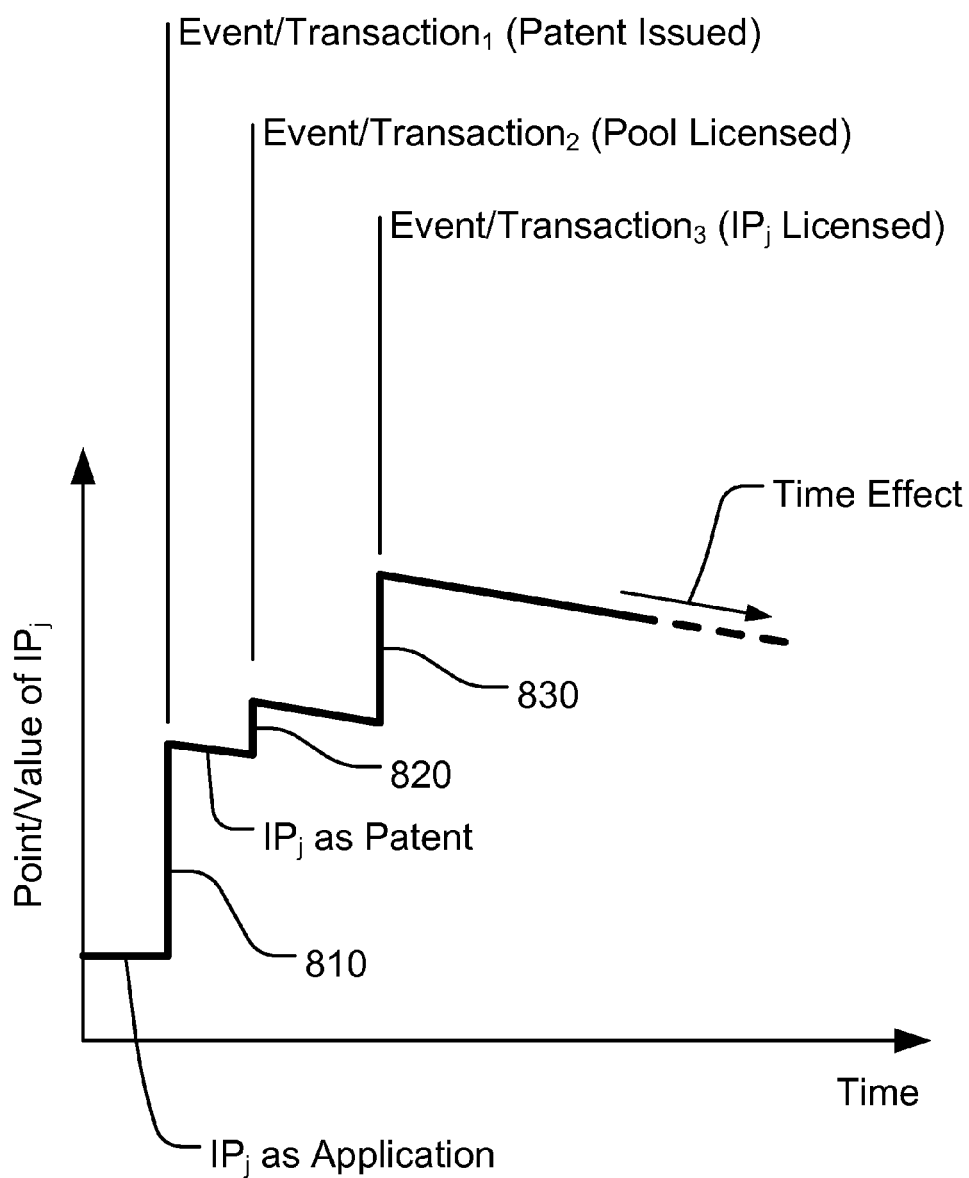
FIGS. 8 and 9 depict a time evolution of point/value of an IP instrument based on administrative, status change, legal, transactional events and time, in an embodiment of this invention.
Figure 9:
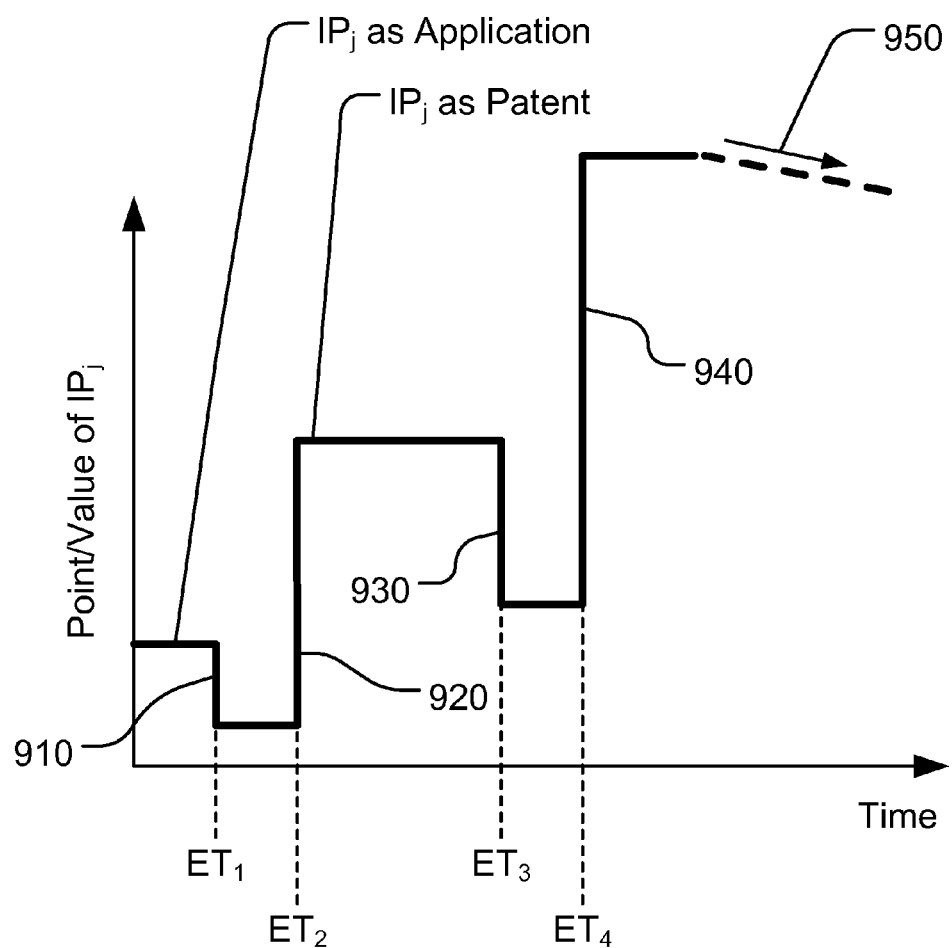

In one embodiment, for example as depicted in FIGS. 8 and 9, a value/point system is used to track points or value associated an IP instrument at a given time. In one embodiment, the changes in points or value associated with an IP instrument ($P_j$) is based on transactions (e.g., financial), events (e.g., legal, administrative, market, or business), or time based (e.g., the diminishing patent effective enforcement life time for post/future infringement). In one embodiment, such point/value system provides a more objective method in providing a value system for the purposes of pool distribution or a bonus distribution to a sub-pool (e.g., a logical sub-pool), where multiple parties have different financial interests as beneficiaries of such distributions.

In one embodiment, as for example depicted in FIG. 8, a point/value is assigned to an IP instrument, e.g., in form of patent application (or patent), upon entry or an effective time before/after its entrance to the pool. In one embodiment, one or more points or a set of point values are used to initialize/assign the point/value of an entry level application (e.g., at various states such as just filed, passed office action, at non-final or final status, at RCE or appeal status, some claims allowed, or received issuance notice) or an entry level patent (e.g., at various states such as just issued, already generated licensing, at reissue/reexamination stage, at litigation stage, passed reexamination, passed litigation, or passed settlement).

In one embodiment, for example, an added patent application take a point value $P_0$, (e.g. $P_0=1$ point). In one embodiment, each issued patent take a point value (r. $P_0$), where r is larger than 1 (e.g., 10). In one embodiment, for example, when a new patent is added, it initially takes a point value of score of (r. $P_0$).

In one embodiment, $P_j$ changes upon a status change event. For example, in one embodiment, upon issuance of the patent, $P_j$ increases (810), e.g. to reflect the enforceability right of the instrument.

In one embodiment, $P_j$ increases (820) upon a Pool Licensing event (or a sub-pool which $IP_j$ is a member). In one embodiment, such increase in $P_j$ reflects the $IP_j$'s value/point due to its contribution to the revenue generation on a pool level capacity. In one embodiment, such increase reflects the $IP_j$'s value/point reflects the income/revenue generation value of the existing IP instruments in the pool with respect to other applications/patents that may join the pool at a later time.

In one embodiment, $IP_j$ increases based on an individual or sub-pool licensing event, e.g., $IP_j$ contributed to the generated revenue on individual or a sub-pool level capacity. In one embodiment, upon licensing of $IP_j$ or settlement or recovery of damages in a proceeding involving $IP_j$, $P_j$ increases (830) to explicitly reward such an event or transaction at the IP instrument level (or sub-pool level). In one embodiment, such increase in $P_j$ (e.g., 830) tends to differentiate $IP_j$ value/point with respect to those of other IP instruments in the pool, while increase in $IP_j$ at pool level (e.g., 820), tends to reduce differentiation in point/value of the IP instruments within the pool. Therefore, in one embodiment, the increased tendency to license the pool versus generating income/revenue based on few specific IP instruments, results in more uniform point/values for various IP instruments, and hence, an otherwise more uniform pool distribution among IP instruments.

In one embodiment, $P_j$ may be reduced by passage of time, for example, to reflect the finite life of the IP instrument. In one embodiment, a time model reflects the scope of enforcement for recovery of past infringement (or settlement or licensing/covenant not to sue). In one embodiment, a statute of limitation laws/rules is applied in the time model. For example, in one embodiment, 6 years is used as default scope for past infringement enforcement as a default value (e.g., as current statute of limitation). In one embodiment, the default is overridden based on facts related to the IP instrument affecting the extent of enforceability of rights on a prior infringement.

In one embodiment, a time model reflects the scope of enforcement for recovery of future infringement. In such an embodiment, the point/value associated with the IP instrument reflects the extent of licensing for future use, make, sale, or import. In one embodiment, the time model uses a linear model (e.g., for licensing against future infringement) proportional to the remaining life of the IP instrument. In one embodiment, the time model is adjusted for the then current value of future revenue/royalty for subsequent years based on an interest rate and/or inflation rate.

In one embodiment, the new value of $P_j$ is determined based on the current value of $P_j$ and the category of event/transaction. In one embodiment, the change in $P_j$ (i.e., $\Delta P_j$) is determined by the corresponding category of event/transaction. In one embodiment, one or more sets of $\Delta P_j$ values/formulas/expressions are used and/or maintained associated with a given category of event/transaction and/or a given category of IP instrument. In one embodiment, for example, $\Delta P_j$ is 50 points, when an IP instrument changes its status from application form to an issued patent. In one embodiment, the $\Delta P_j$ values are furthered adjusted based on the properties of the pool. For example, a multiplier is used to adjust $\Delta P_j$ values based on the total pool's $P_j$. In one embodiment, some $\Delta P_j$ values/formulas/expressions include parametric values that use $IP_j$'s and/or the pool's properties/historical data.

In one embodiment, the time model is applied after affecting other events or transactions affecting $P_j$. In one embodiment, the time model is applied as between other transactions and event affecting $P_j$. In one embodiment, taking FIG. 8 as demonstration, the time model is applied between events 810, 820, 830, before applying the $\Delta P_j$ corresponding to those events.

In one embodiment, as depicted in FIG. 9, various events/transactions affect the point/value of an IP instrument. In one embodiment, for example, $IP_j$ is introduced to the pool as an application, and it is assigned an initial point/value. In one embodiment, a final rejection event ($ET_1$) (e.g., rejecting the claim(s) in a patent application by the USPTO) reduces the point associated with $IP_j$ (910). In one embodiment, overcoming a final rejection event ($ET_2$) (e.g., granting the claims by the USPTO Board of Patent Appeals and Interferences) increases $P_j$ (920). In one embodiment, overcoming final rejection through an RCE also increases $P_j$; however, in one embodiment, such increase in $P_j$ may be different when claims are granted by the USPTO Board of Patent Appeals and Interferences, for example, because further immunity is built into the patent claims due to the higher review. In one embodiment, $P_j$ may decrease (930), e.g., upon cancelation or change event ($ET_3$) for one or more patent claims during a reexamination proceeding at the USPTO. In one embodiment, $\Delta P_j$ may depend on the scope and coverage changes to the claims. In one embodiment, new $P_j$ depend on the nature (e.g., independent, dependent, or scope) or number of claims surviving reexamination. In one embodiment, the reexamination event changing the claims may increase $P_j$ by avoiding prior art while covering infringing products, systems, or processes. In one embodiment, $P_j$ increases (940), for example, upon settlement or damage recovery events ($ET_4$), for example, following a reexamination proceeding. In one embodiment, $P_j$ decreases (950) based on useful life of patent and the extent and scope of its enforcement (e.g., enforceability against past and future infringement). In one embodiment, $P_j$ increase or decrease due to emergence or shrinkage of a potential licensing or commercial market in the field of the IP instrument.

In one embodiment, a licensing effort may result in a periodic payment (e.g., royalty) and/or a lump sum amount. In one embodiment, each time a payment event (e.g., for royalty) occurs, there will be an increase in $P_j$ (for example, an equal amount or an amount adjusted for interest rate or inflation, or an amount based on then current value of $P_j$). In one embodiment, a current value of the future (e.g., periodic) installments are determined, approximated, or estimated, and $P_j$ is increased based on such current value. In one embodiment, a license may provide an option which allows a licensee to continue/extend the license after the initial term of the license, e.g., at some renewal period of time. In one embodiment, an increase in $P_j$ due to the initial licensing will follow another increase in $P_j$ due to extension of the license. In one embodiment, an increase in $P_j$ due to initial licensing will follow a reduction in $P_j$ in case the extension does not occur, e.g., during a renewal period of time. In one embodiment, an increase (or portion thereof) in $P_j$ will be kept effectively for the limited duration of the license. In one embodiment, each time a periodic payment (e.g., royalty) is made with respect to an IP instrument or a pool/sub-pool, corresponding distributions (e.g., bonus and pool distributions) are made. In one embodiment, the period or frequency of actual allocation and/or payment of the portion of the proceeds with respect to an IP instrument is not the same as the payment of such portions of proceeds to the account(s) associated with the IP instrument. In an embodiment, for example, a royalty may be received on a monthly basis due a licensing effort involving an IP instrument, while the actual payments to the account related to the IP instrument (e.g., that of IP assignor beneficiary) may be made quarterly.

Figure 10:
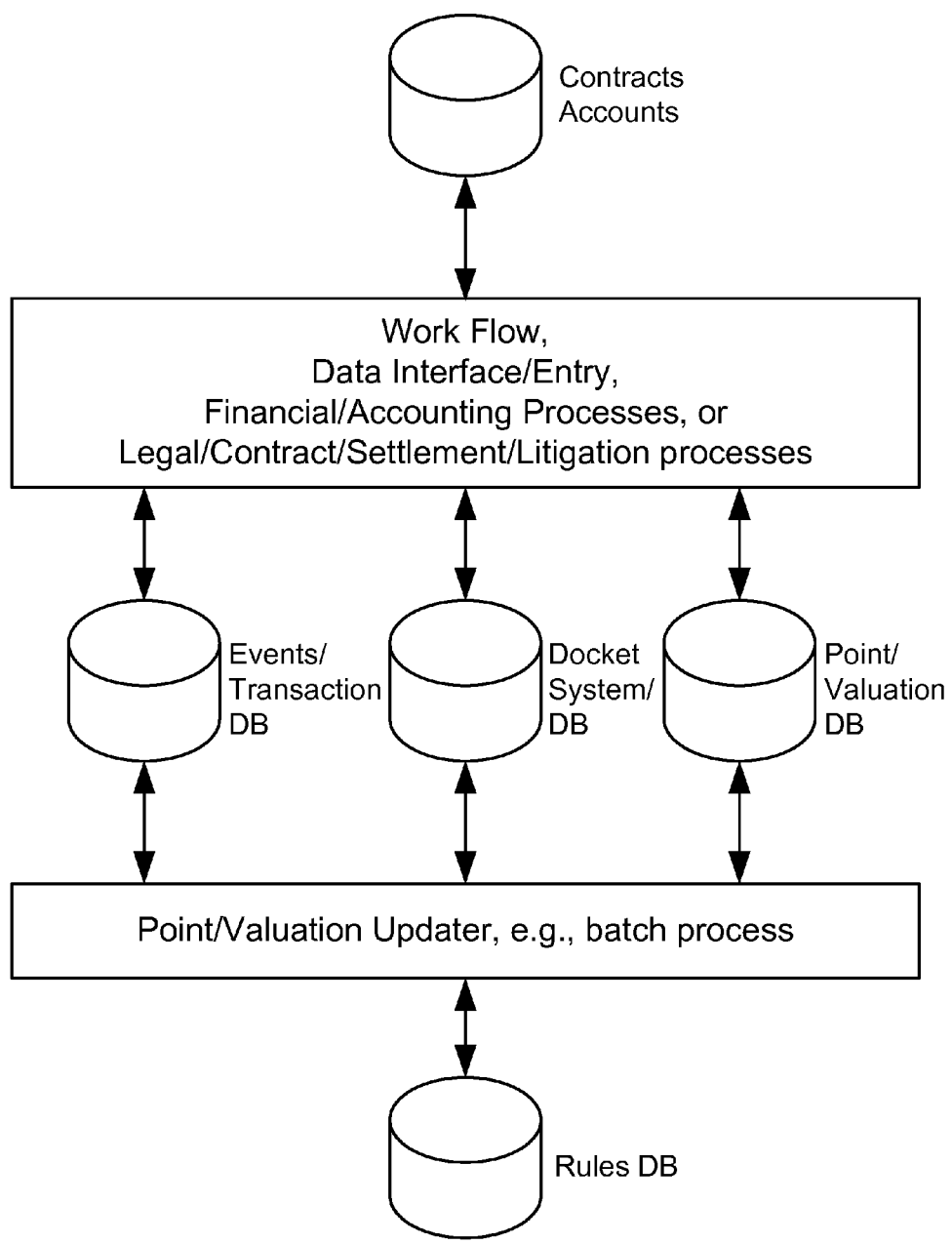
FIG. 10 depicts the components of an updating and maintenance system for IP points/values, for example in an IP pool, in an embodiment of this invention.

In an embodiment, for example as depicted in FIG. 10, based on events/transactions or at periodic time intervals or predetermined times, a point/valuation updater process updates the values/points associated with IP instruments in the IP pool(s) (or sub-pools). In one embodiment, the updating process is done in a batch mode. In one embodiment, the updater process or system uses events/transactions data, data from docketing system/database, existing points/values associated with various IP instruments, pools and sub-pools definitions, and points updating rules, formulas, or tables, to update points/values associated with the IP instruments. In one embodiment, the points/values are updated in a point/values database. In one embodiment, the current point/values of IP instruments are kept in a database. In one embodiment, historical values of point/values of IP instruments are kept in a database. In one embodiment, one, more, or all of such historical values are associated with effective start and/or end times. In one embodiment, a snap shot of the data, such as a materialized view of database table(s), is used to determine updated point/value of IP instrument(s). In one embodiment, data from work flow, data entry interfaces, and for financial/accounting systems, business processes, legal or contractual processes (manual or automated), or batch processes are processed, entered, and/or extracted into/from one or more databases including docketing database, events/transaction database, accounting database, IP instrument point/value database, rules database, contracts and accounts database, customer/client database, and potential infringer database.

In one embodiment, a time delay is used between running an updater process (e.g., a batch process) and the effective cut off time/date for determining the updated point/value of IP instruments. In one embodiment, the time delay (e.g., one to seven days) is used, so that the data reflecting the transactions on or prior to effective cut off time/date have most likely been entered to the system in order to have a chance to be incorporated in the updating calculations.

In one embodiment, an updater process is run upon triggering by events or transactions, and/or in absence of such events/transactions after a period of time following a previous update. In an embodiment, an updater process is run periodically (e.g., daily, weekly, monthly, quarterly, and/or annually).

In one embodiment, a distribution to a pool is treated as distributed with respect to IP instruments in the pool, based on their points/values at the time of distribution or at an effective time (e.g., determined hourly, daily, weekly, monthly, annually, etc.).

In one embodiment, a revenue or income (e.g., associated with licensing or settlement) may be associated with a period of time (e.g., when such efforts to generate the revenue/income began until the revenue/profit is realized). In an embodiment, for the purposes of distributing the portion of revenue/income to the pool, such period of time is divided into one or more intervals (with equal or unequal durations), and the pool distribution corresponding to the revenue/income is allocated (e.g., prorated) on these intervals. In one embodiment, each (e.g., prorated) portion of the pool distribution for an interval is then distributed based on the IP instruments points/values at, for example, an effective time associated with that interval or at the end of that interval. In an embodiment, the distribution per interval takes into account the varying makeup of the pool as well as varying points/values of the IP instruments during the efforts that yielded a revenue/income to be distributed to the pool. In one embodiment, the timing and number of intervals is determined by the category, events, and/or milestones associated with the revenue/income generation effort. In one embodiment, the allocated percentage or portions of the pool distribution from a revenue/income, for each interval is determined based on duration of interval, category, events, and/or milestones associated with the revenue/income generation effort.

As an example, a licensing effort for an IP instrument $IP_j$ ends up with generation income/revenue of X amount after such effort ends up in litigation before major discovery begins. In this example, assume a three-month licensing negotiation is followed by 9 months of litigation (e.g., 4 months into discovery process and claim construction activities for Markman hearing) before the settlement and income/revenue is achieved for the revenue generation effort. After subtracting direct costs, allocated indirect cost, portion of profit allocated to shareholders/investors, and a bonus amount, an amount Y is allocated for the pool distribution. In one embodiment, for example, this 1 year effort is divided into three intervals: first 3-month interval (i.e., the initial licensing effort), next 5-month interval (i.e., pre-discovery litigation), and last 4-month interval (i.e., post discovery litigation effort). In one embodiment, a combination of time and/or category is used for allocation of Y per interval. For example, relative category weights for intervals may be 1 (for pre litigation licensing), 2 (for pre discovery litigation) and 4 (for post-discovery litigation). In one embodiment, the allocation of Y per interval, driven by category weight, may be 1/7, 2/7, and 4/7, respectively. In one embodiment, the allocation Y per interval, prorated solely by time, may be 3/12, 5/12, 4/12, respectively. In one embodiment, the allocation of Y per interval, driven by a multiplicative combination of time duration and category weight, may be (1×3)/(1×3+2×5+4×4), (2×5)/(1×3+2×5+4×4), and (4×4)/(1×3+2×5+4×4), respectively.

In one embodiment, the allocation of the pool distribution per interval is further adjusted to account for effective distribution spaced in time. In one embodiment, past value allocated to an interval with an effective date in the past, is adjusted to current value at actual effective date for distribution using a rate (e.g., related to inflation rate and/or an interest rate). For example, in one embodiment, suppose there are n intervals and the pool distribution D is allocated to these intervals as $D_1, D_2, \ldots, D_n$. Given the effective date of each interval and the actual effective date of distribution of D, the $i^{th}$ interval is associated with a conversion factor (from past value to current value) $\alpha_i$ which is typically more than 1. Additionally, suppose that the allocation of D per interval based on interval allocation rules (disregarding the past/current value conversion) yields an allocation fraction $\beta_i$ for the $i^{th}$ interval:

$$D = \sum_{i=1}^{n} D_i$$

$$\sum_{i=1}^{n} \beta_i = 1$$

$$D'_i = \frac{D_i}{\alpha_i}$$

where $D'_i$ is the past value of the distribution $D_i$ for the $i^{th}$ interval, which is unadjusted for the time-value conversion. Therefore, $D'_i$ follows the same relative allocation ratios as $\beta_i$:

$$D' = \frac{D'_1}{\beta_1} = \ldots = \frac{D'_i}{\beta_i} = \ldots = \frac{D'_n}{\beta_n}$$

therefore, $$D = \left(\sum_{j=1}^{n} \alpha_j \cdot \beta_j\right) \cdot D'$$

or $$D_i = \frac{\alpha_i \cdot \beta_i}{\sum_{j=1}^{n} \alpha_j \cdot \beta_j} \cdot D$$

In one embodiment, where such time-value conversion is insignificant or disregarded (i.e., $\alpha_i$ is about 1), $D_i$ is determined or approximated as $(\beta_i \cdot D)$.

In one embodiment, $\alpha_i$ for the $i^{th}$ interval is determined as $$\alpha_i = (1+r)^{T_i} = e^{T_i \cdot \ln(1+r)} \cong e^{r \cdot T_i} \text{(approximation for } r \ll 1)$$

or $$\alpha_i \cong 1 + r \cdot T_i \text{ (approximation for when both } r \ll 1 \text{ and } r \cdot T_i \ll 1)$$

where r is time-value conversion rate (e.g., the daily interest) and $T_i$ is the duration (e.g., number of days) from the interval's effective date/time until the effective date/time of the pool distribution. In one embodiment, variable rate is used to determine $\alpha_i$.

In one embodiment, once an allocation (of Y) per interval is determined, each allocation is distributed to contracts/agreements associated to IP instruments in the pool at the effective time associated with the interval (e.g., at the end of the interval or at the nearest periodic update effective date/time before (or after) the end of the interval).

In one embodiment, an allocation of pool distribution allocated to an interval (e.g., $D_i$ or D (for a single interval)) with respect to the IP instruments in the pool during that interval is determined by the time average points/value of individual IP instruments in the pool during that interval ($\tau$). In one embodiment, where $P_j$ is modeled in a continuous form, its time average is determined as:

$$\overline{P}_J = \frac{1}{\tau} \cdot \int_{over \tau} P_j \cdot dt$$

and in one embodiment where $P_j$ is, for example, updated and evaluated in discrete or step-wised time durations:

$$\overline{P}_J = \frac{1}{\tau} \cdot \sum_k P_{j,k} \cdot \tau_k$$

where $P_{j,k}$ is the point/value of $IP_j$ during the time slice $\tau_k$ and where these time slices add up to cover $\tau$. In one embodiment, where the distribution per IP instrument is based on the weighted time averaged point/value of IP instruments, for the purposes of distribution per IP instrument:

$$V_j = f(\overline{P}_j)$$

where f is a function, formula, or a relationship (e.g., tabular). In one embodiment, f returns the parameter itself, or:

$$V_j = \overline{P}_j$$

In one embodiment, as depicted in FIG. 10, an updater process determines a change in status of an IP instrument by analyzing the data from docketing system/database (e.g., for determining the prosecution status of an IP instrument, the expiration time, whether a reexamination or a request for reexamination is terminated, whether status of claims changed). In one embodiment, an updater process determines the events/transactions related to an IP instrument by determining the events and transactions directly related to the IP instrument, or related to pool(s), which the IP instrument is a member. In one embodiment, an identifier is assigned to an IP instrument. In one embodiment, such an identifier is unique among IP instruments. In one embodiment, the transactions/events data have a field for the IP instrument identifier. In one embodiment, data is kept in relation database(s). In one embodiment, there is a many-to-many or many-to-one relationship between the events/transactions and the IP instruments.

In one embodiment, various events/transactions are categorized. In one embodiment, a category of event/transaction is defined by pre-identified fields or flags (including those for input or calculated). In one embodiment, the transactions/events are expressed in an extensible data format (e.g., XML or a version of markup language). In one embodiment, rules, formula, calculations, or processes use the fields in the data structure to read/write values.

In an embodiment, an example of event include a pool distribution event, having a unique event identifier, a timestamp, identity of a pool (or sub-pool), amount of distribution, identification of the activity(ies) associated with the distribution. In one embodiment, an activity is defined by a type of activity (e.g., licensing activity), having a start time (or an end time). In one embodiment, an activity is associated with one or more activity intervals. An activity interval is associated with a type, start time and/or duration. In one embodiment, an activity interval type may be associated with a weight factor, e.g., used to determine the relative distribution allocated between the intervals associated with an activity.

In an embodiment, pools are identified by their unique identifiers. In one embodiment, there is a one-to-many or many-to-many relationship between pool identifier and IP instrument identifiers. In one embodiment, a record associated with an IP instrument is tagged with a pool identifier (e.g., as a foreign key). In one embodiment, an intercept table contains or maintains association between a pool identifier and an IP instrument identifier. In one embodiment, an intercept table identifies an association between pool identifiers and sub-pool identifiers.

In one embodiment, an activity is associated with one or more IP instrument identifiers. In various embodiments, such association may be direct (e.g., in a table) or indirect (e.g., resolved through relational queries). In an embodiment, an activity is associated with a pool (or sub-pool), directly or indirectly. In one embodiment, an association between an activity and an IP instrument identifies a level or percentage of bonus distribution with respect to the IP instrument. In one embodiment, a transaction associated with an activity is identified as income/revenue related. A portion revenue/income (e.g., subtracted by costs) associated with the transaction is then allocated as bonus to the IP instruments associated with the activity, e.g., based on the level of percentage or bonus distribution associated with that activity and the IP instrument.

In one embodiment, an allocation of a potion of income/revenue (e.g., bonus or pool distribution) to an IP instrument comprises such allocation to a contract/agreement account associated with such IP instrument and/or activity. In one embodiment, a table in a database associates an IP instrument with one or more accounts for payment of proceeds allocated with respect to the IP instrument. In one embodiment, the accounts associated with the IP instrument are determined by a queried. In one embodiment, a default account is associated with the IP instrument. In one embodiment, other account(s) associated with the IP instrument are tagged with an attribute. Such account(s), for example in an embodiment, is used when the distribution with respect to the IP instrument satisfies (or is associated with an activity that satisfies) the conditions related to the attribute. In one embodiment, multiple accounts are associated with an IP instrument, and the distribution is allocated based on some weight/proportion or rules corresponding to such accounts. For example, in one embodiment, multiple inventors/investors, a group of co-owners or an entity assigns an IP instrument to the pool, and then, multiple payment accounts are setup for allocation/payment of the intended proceeds to the beneficiaries of such assignment. In an embodiment, such accounts may have different relative weights/proportions assigned to them for allocation of the intended distribution with respect to the IP instrument to the beneficiaries. In one embodiment, rules for distribution may be used to allocate the proceeds in a particular sequence and/or amounts to such accounts (for example, the first beneficiary gets the first 5 installments after getting a fixed amount of $20,000; the second beneficiary gets next 10 installments; and then, the subsequent installments are split 30% and 70% between them). In one embodiment, a rules engine/process queries the corresponding rules from the rules database and/or data from the accounts and determines the allocation of the distribution between the accounts, accordingly. In one embodiment, a payment allocated to an account is made upon a triggering event (e.g., effective date of distribution), or periodically (e.g., daily, weekly, monthly, quarterly, and/or annually).

Figure 11:
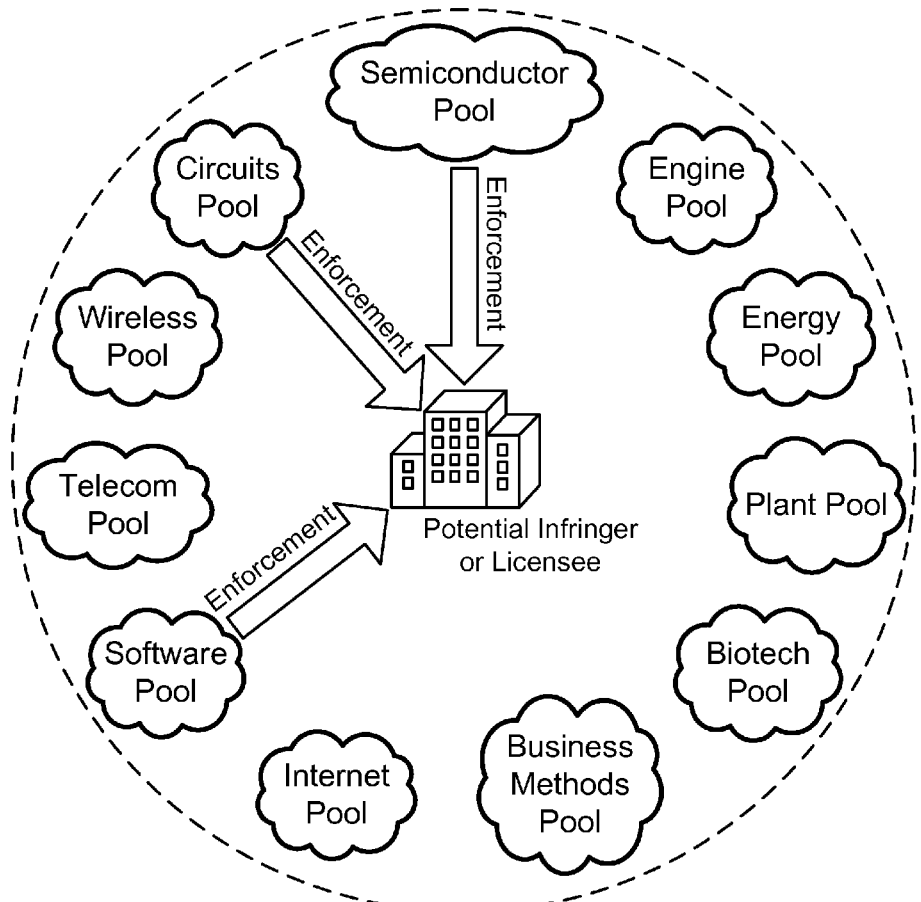
FIG. 11 depicts the multiple enforcement prongs based on multiple pools (for example organized based on an attribute such as technology or IP type), in an embodiment of this invention.

In an embodiment, as for example depicted in FIG. 11, multiple pools of IP instruments are maintained. In one embodiment, such pools are for example, organized based on the technical subject matter, types of patent, or type of industry related to their IP instruments. In one embodiment, an IP instrument may belong to one or more logical pools. In one embodiment, a licensing effort may entail enforcement of IP right against a potential infringer using IP instruments from one or more pools concurrently.

Figure 12:
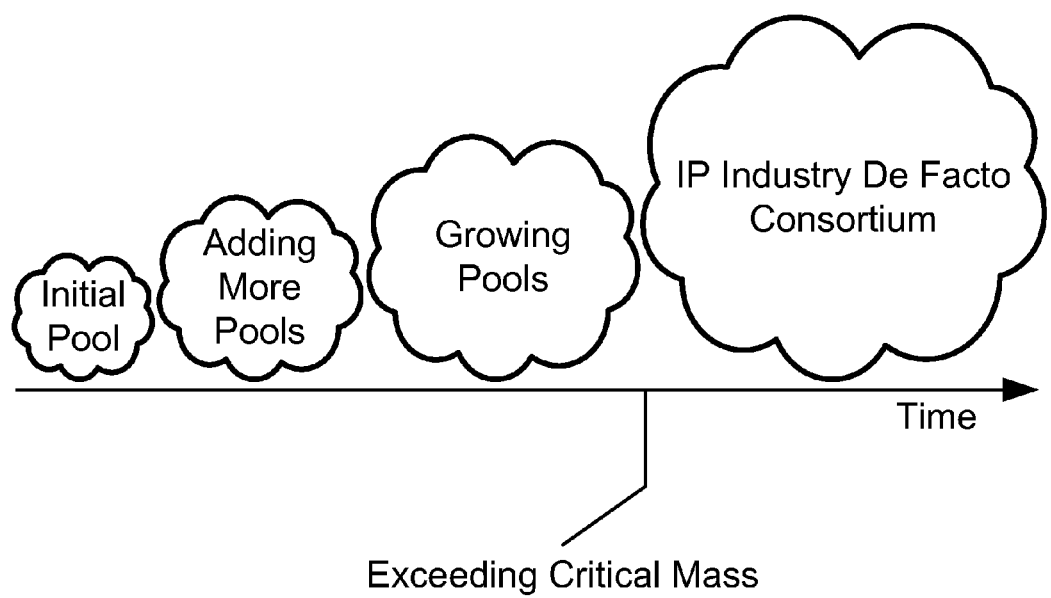
FIG. 12 depicts progression of IP pool(s) through a critical mass, in an embodiment of this invention.

In one embodiment, as for example depicted in FIG. 12, an initial pool is setup, and the portfolio is grown by additional IP instruments and/or additional pools. Once the growth of portfolio exceeds a critical mass, the portfolio may become an IP industry de facto consortium, which may generate significant income/revenue through licensing without relatively significant litigation cost. In such a scenario, the IP portfolio/pool(s)/scoring system behaves as an IP clearinghouse for IP developers and IP users.

Figure 13A:
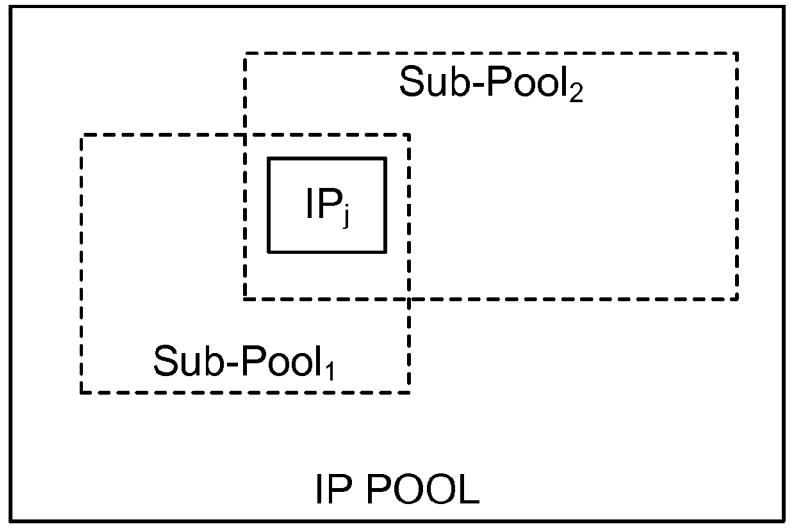
FIG. 13(a)-(b) demonstrate membership of an IP instrument in multiple sub-pools or pools, respectively, in an embodiment of this invention.

In one embodiment, as for example depicted in FIG. 13(a), an IP instrument, $IP_j$, belongs to multiple sub-pools (e.g., $Sub\text{-}Pool_1$ and $Sub\text{-}Pool_2$) defined within an IP pool. Such sub-pools are then logical sub-pools. In one embodiment, as for example depicted in FIG. 13(b), an IP instrument $IP_j$ may belong to multiple IP pools (e.g., $Pool_1$ and $Pool_2$). For example, an IP instrument may belong to Wireless Pool, Telecom Pool, and Internet Pool, simultaneously.

Figure 14:
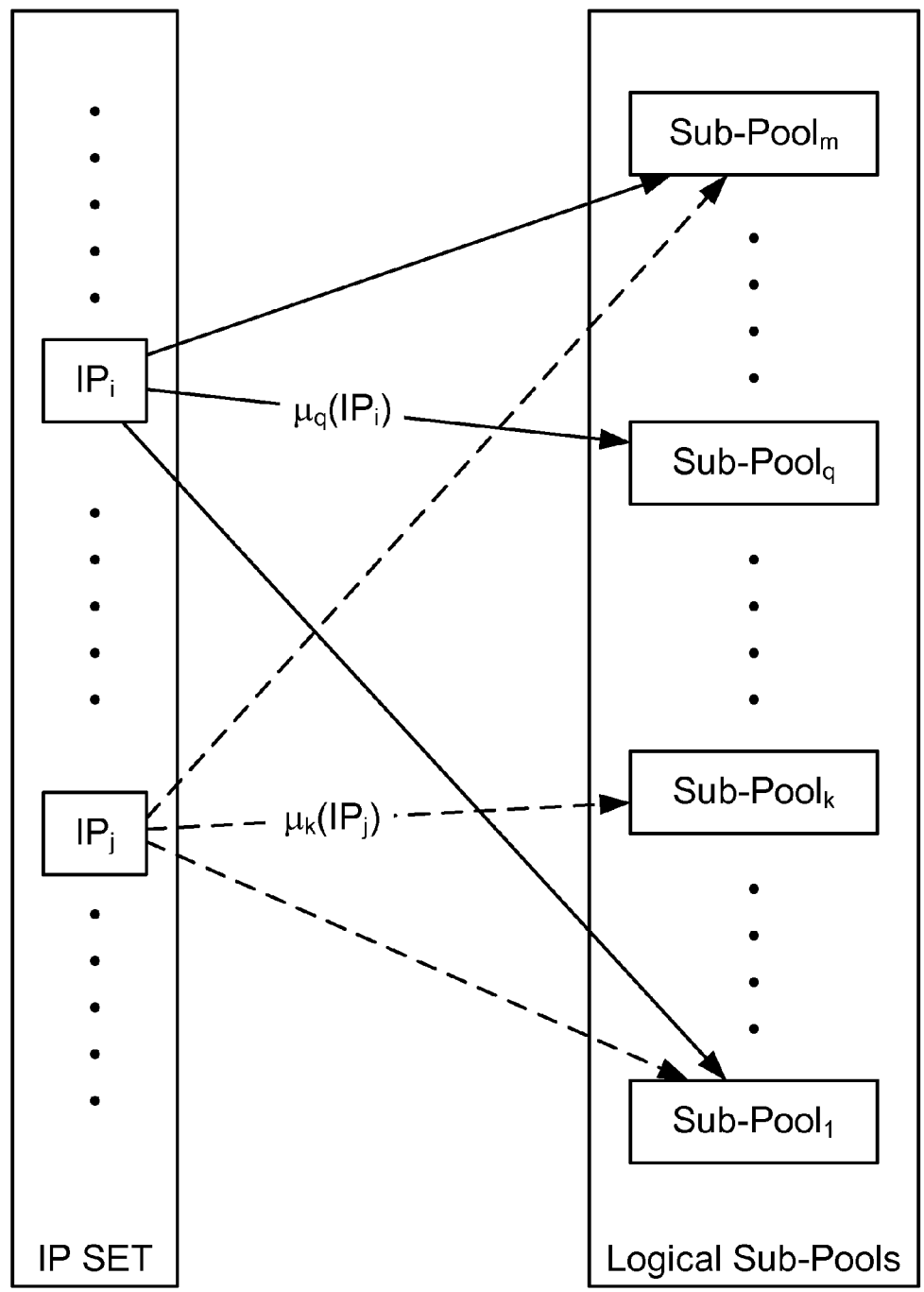
FIG. 14 demonstrates membership of various IP instruments in multiple logical sub-pools or pools, in an embodiment of this invention.

In one embodiment, as for example depicted in FIG. 14, a membership level is defined between an IP instrument (e.g., $IP_i$ and $IP_j$) and various logical sub-pools (or pools). For example, for n IP instruments in the IP set and m sub-pools, there may be (n×m) membership associations. In one embodiment, the membership association of $IP_i$ with $Sub\text{-}Pool_q$ is defined as functional form $\mu_q(IP_i)$. In one embodiment, the value of $\mu_q(IP_i)$ is binary (e.g., 0 or 1; False or True), which means whether or not the IP instrument belongs to the sub-pool. In one embodiment, the membership function may be based on fuzzy set/logic, taking fractional values. In one embodiment, values of $\mu_q(IP_i)$ for various q identify the relative weight factor for distribution of related income/revenue for pool distribution to various sub-pools or pools. In one embodiment, a membership function $\mu_q(IP_i)$ is used to allocate a portion of income/revenue generated in relation to $IP_i$, as pool distributions, to multiple pools in which $IP_i$ belongs. In one embodiment, assuming that $X_i$ is amount of pool distribution due to a revenue/income generation associated with $IP_i$, the allocation of such pool distribution for various pools is as follows:

$$X_{i,q} = X_i \cdot \frac{\mu_q(IP_i)}{\sum_{k=1}^{m} \mu_k(IP_i)}$$

In one embodiment, membership values or functions of $IP_j$ in a pool or sub-pool varies in time, e.g., based on change in scope of claims, change in market, or change in makeup of the pools/sub-pools.

Figure 15:
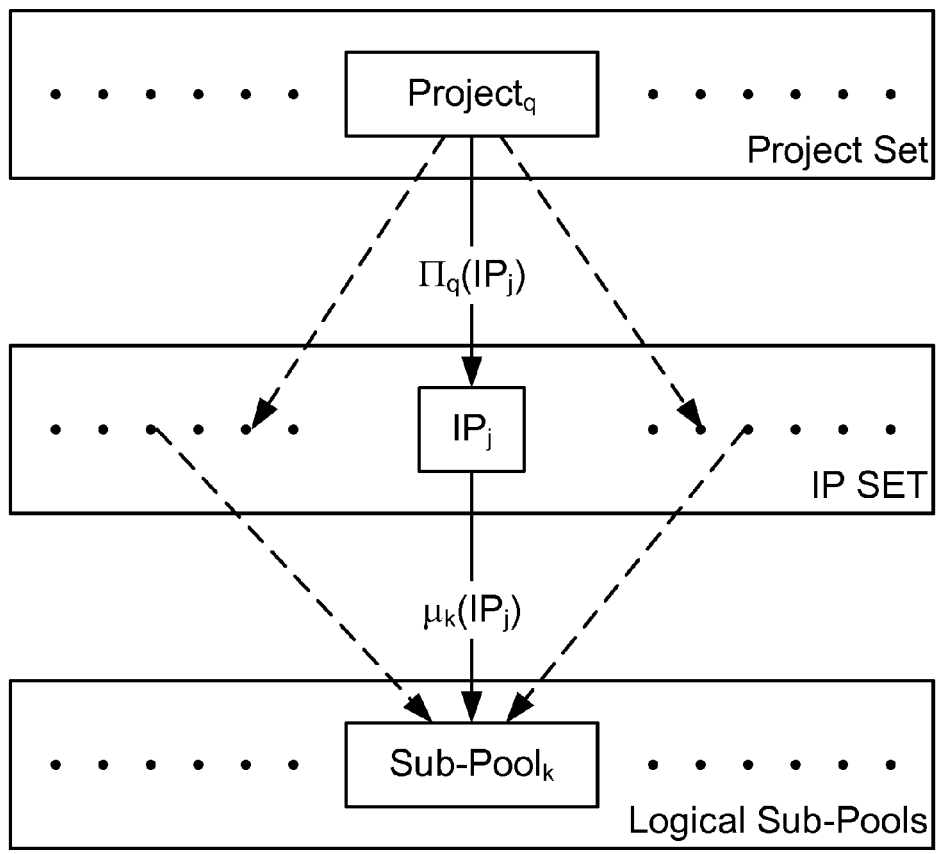
FIG. 15 demonstrates membership of various IP instruments in multiple logical sub-pools or pools, as well as their relative contribution to revenue generating projects, in an embodiment of this invention.

In one embodiment, as for example depicted in FIG. 15, a project or activity may be using or be involved with one or multiple IP instruments. For example, a licensing activity may be licensing 3 patents to a prospective licensee. In such an embodiment, there may be a project or activity dependent allocation, weight, or percentage (denoted as $\Pi_q(IP_j)$) with respect to the associated IP instruments. In one embodiment, $\Pi_q(IP_j)$ is used to allocate the bonus distribution portion of income/revenue generated from $Project_q$ to $IP_j$ (e.g., proportionally). A bonus amount $B_q$, may be allocated to $IP_j$, in an embodiment, as follows:

$$B_{q,j} = B_q \cdot \frac{\Pi_q(IP_j)}{\sum_{over\ i} \Pi_q(IP_i)}$$

In one embodiment, $\Pi_q(IP_j)$ is used to allocate the pool distribution portion of income/revenue generated from $Project_q$ to pool(s)/sub-pool(s) in which $IP_j$ is a member. In an embodiment, the allocation to pools/sub-pools are based on the membership values/functions of the IP instruments (in those pools/sub-pools) that are associated with the activity or project generating the pool distribution. In one embodiment, such pool distributions are proportional to the membership function weights, for example:

$$\text{Pool Distribution}_{k,q} = \text{Pool Distribution}_q \cdot \sum_{over\ i} \Pi_q(IP_i) \cdot \mu_k(IP_i)$$

In one embodiment, such pool distributions are based on a time average of the memberships of the IP instruments in the pools during the effective duration/interval(s) associated with the activity or project. In one embodiment, the allocation of pool distributions is as follows:

$$\text{Pool Distribution}_{k,q} = \text{Pool Distribution}_q \cdot \sum_{over\ i} \overline{\Pi_{q,t}(IP_i) \cdot \mu_{k,t}(IP_i)}$$

where the weight factor $\Pi_q(IP_j)$ and/or pool membership value/function $\mu_k(IP_i)$ may be time dependent (hence the subscript t), and the horizontal bar denotes the time average. In one embodiment, where an activity is partitioned to activity intervals and the pool distribution is allocated to such intervals, various embodiments may also operate at interval level based on the pool distribution allocated for each interval.

Figure 16:
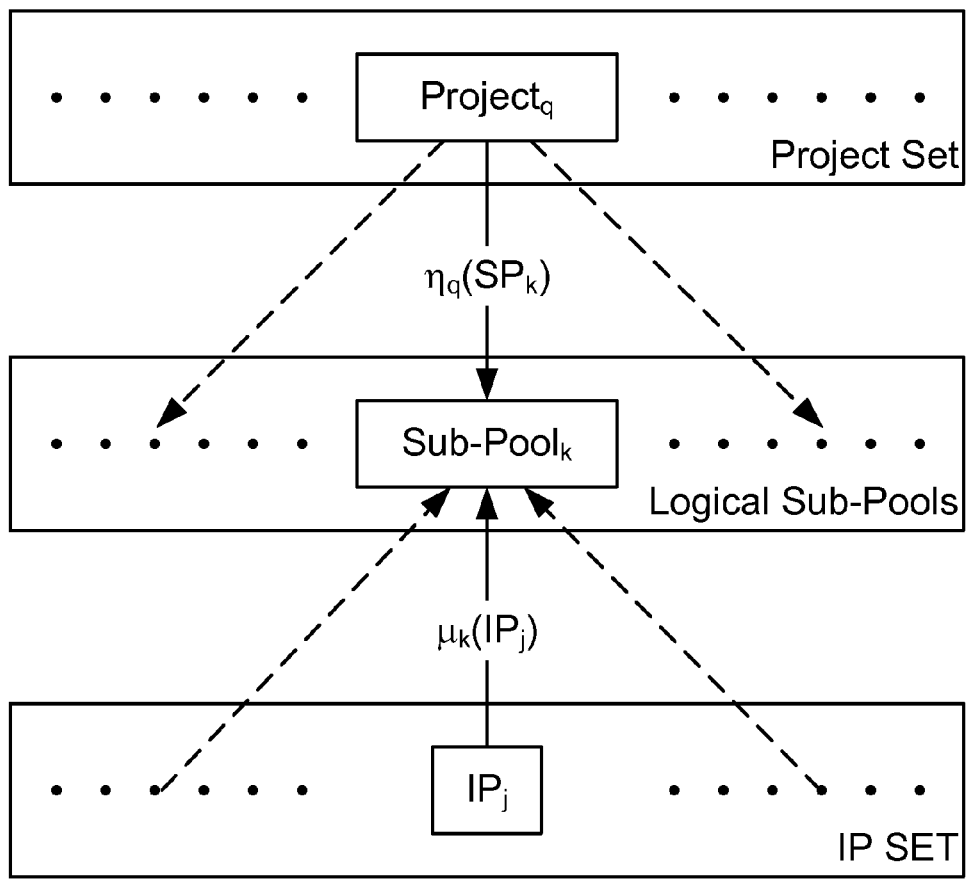
FIG. 16 demonstrates membership of various IP instruments in multiple logical sub-pools or pools, as well as the sub-pools contribution to revenue generating projects, in an embodiment of this invention.

In one embodiment, as depicted in FIG. 16, a project or activity is associated with one or more pools/sub-pools. For example, in one embodiment, a activity is licensing one or more pool to a prospective licensee. In one embodiment, pool distribution as a portion of income/revenue generated from the activity is allocated to various pools/sub-pools based on weight factors (that may be project dependent), $\eta_q(SP_k)$, where $SP_k$ denotes the $k^{th}$ sub-pool (or pool). In one embodiment, the pool distribution from activity or project is distributes proportionally to the weight factors per pool/sub-pool:

$$\text{Pool Distribution}_{k,q} = \text{Pool Distribution}_q \cdot \frac{\eta_q(SP_k)}{\sum_{over\ i} \eta_q(SP_i)}$$

In one embodiment, the activity is partitioned into one or more intervals with the pool distribution allocated to such intervals. In one embodiment, the allocation of the pool distribution to various pools may be done at interval level, based on the allocation of the pool distribution to each interval. In one embodiment, a weight factor $\eta_q(SP_k)$ is time dependant. In one embodiment, a time average allocation scheme is used to allocate the pool distribution to various pools/sub-pools. In one embodiment, for example, such an allocation is determined by:

$$\text{Pool Distribution}_{k,q} = \text{Pool Distribution}_q \cdot \frac{\overline{\eta_{q,t}(SP_k)}}{\sum_{\text{over pools/sub-pools}} \overline{\eta_{q,t}(SP_i)}}$$

Such an embodiment takes into account inclusion of an IP pool or sub-pool as part of the activity's licensing effort while such activity has already been underway. In one embodiment, an activity may be associated to intervals where one or more such intervals are delineated by such change in $\eta_q(SP_k)$. Various models for time averaging may be used in various embodiments, such as continuous or discrete models, integration, algorithm or formulas, or stepwise summations.

In one embodiment, a distribution to a pool (e.g., $SP_k$) is allocated to the IP instrument in such a pool (or sub-pool), e.g., based on membership function/value ($\mu_k(IP_j)$) of such IP instruments (e.g., $IP_j$) in the pool(s)/sub-pool(s).

In one embodiment, the distribution to $SP_k$ is determined based on (e.g., time-dependent) distribution to the IP instruments. For example, in an embodiment, the distribution allocated to an IP instrument due to a multi-pool distribution is:

Distribution Allocated to $IP_j =$ $$\text{Project Pool } Distrib_q \cdot \int_T \sum_k \Omega_{k,j}(t) \cdot \Phi_{q,k}(t) \cdot dt$$

or

Distribution Allocated to $IP_j = \text{Project Pool } \overline{Distrib_q \cdot \sum_k \Omega_{k,j}(t) \cdot \Phi_{q,k}(t)}$ where $\Omega_{k,j}$ denotes the relative allocation weight of the $k^{th}$ pool/sub-pool distribution with respect to the $j^{th}$ IP instrument, at a given time t, and $\Phi_{q,k}$ denotes the relative allocation weight of pool distribution from the $q^{th}$ project to the $k^{th}$ pool/sub-pool, at a given time t. In one embodiment, such allocation weights may be determined proportionally to individual memberships and weights associations between projects, pools, and IP instruments:

$$\Omega_{k,j}(t) = \frac{\mu_{k,t}(IP_j)}{\sum_{\text{over } i} \mu_{k,t}(IP_i)}$$

and/or $$\Phi_{q,k}(t) = \frac{\eta_{q,t}(SP_k)}{\sum_{\text{over } i} \eta_{q,t}(SP_i)}$$

Figure 17:
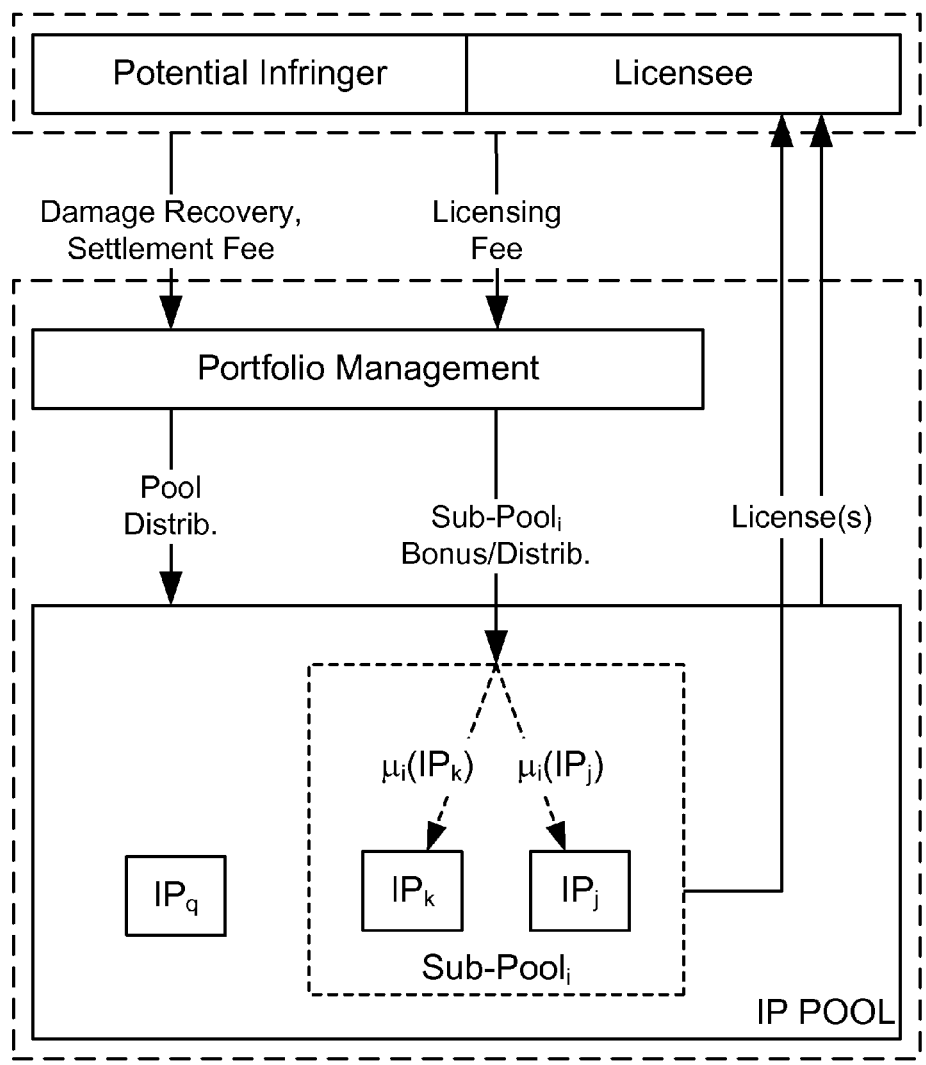
FIG. 17 demonstrates the bonus/distribution to a sub-pool (e.g., a specific purpose logical sub-pool), in an embodiment of this invention.

In one embodiment, as depicted for example in FIG. 17, a sub-pool (e.g. Sub-Pool$_l$) is setup based on one or more IP instruments (e.g., $IP_k$ and $IP_j$). In one embodiment, such a sub-pool is setup for specific purpose (e.g., for one or more specific activities or projects). In such a sub-pool, the membership values/function (e.g., $\mu_l(IP_k)$ and $\mu_l(IP_j)$ of these same IP instruments may be different for other sub-pools/pools. In one embodiment, the sub-pool distribution and/or bonus distribution may be based on such membership values/functions for portions of the income/revenue generated from the activity associated with the sub-pool. In one embodiment, such membership functions/values overrides value/point system of the IP instruments in a pool, for the purposes of allocation of sub-pool distributions and/or bonus to the IP instruments in the sub-pool. In one embodiment, a general pool distribution to the IP pool uses point/values system for the IP instruments (including for example $IP_q$) for allocation of pool distribution with respect to the IP instruments.

In one embodiment, an activity may result in generation of income/revenue which is allocate-able to specific IP instruments in specific amounts. For example, in one embodiment, a settlement agreement or licensing contract allocates or infers the allocation of settlement or licensing proceeds with respect to the IP instruments licensed (e.g., $IP_k$ and $IP_j$). In one embodiment, such allocation is used to determine other allocations such as bonus distribution between the IP instruments (e.g., proportional to the allocation of proceeds). In one embodiment, a sub-pool (e.g., logical) comprising of the IP instruments is used or setup with the IP instrument membership values/weight in the sub-pool based on the allocation of proceeds among the IP instruments (e.g., proportionally). In one embodiment, where the amount of proceed is not specifically allocated between the IP instruments (e.g., by the settlement agreement, licensing contract, or negotiation proceedings), a set of membership values/functions/weights for the IP instruments is used to make such allocations. In one embodiment, a default membership values is determined by setting them to be the same for all the IP instruments involved in the corresponding activity (e.g., 1 divided by the number of the IP instruments involved at a given time, for example, in the corresponding sub-pool).

Figure 13B:
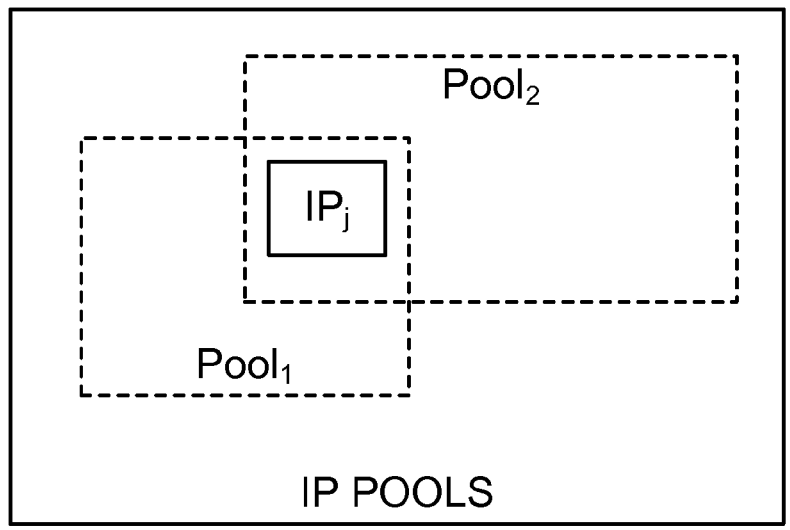

In one embodiment, an IP instrument is associated with multiple pools (e.g., see FIG. 13(b) and FIG. 11). As mentioned in this disclosure, the pool distribution associated with an income/revenue generating activity may be allocated to multiple pools, e.g., based on the membership values/function of the IP instruments within those pools. In one embodiment, a portion of revenue/income is allocated to the IP instrument as bonus, a portion is allocated as pool/sub-pool distribution, and/or a portion is allocated as distribution to a pool consortium (e.g., a combination of multiple pools), where the IP instrument may not be directly a member of such consortium. In one embodiment, such consortium of IP pools is an IP portfolio of the IP management entity. In one embodiment, a portion of income/revenue (e.g., after deducting for various costs and allocations) is allocated to a pool consortium. In one embodiment, a transaction fee or management fee is deducted from such allocation. In one embodiment, a portion of such allocation is retained for pool related activities (such as current and/or future investment in the pool). In one embodiment, an allocation of distribution is made with respect to the pools that are members of the consortium. In one embodiment, such allocation is based on the membership value/function or weight of individual pools within the consortium. In one embodiment, further allocation of the distribution to individual pools follow similar systems and methods as described in this disclosure as allocation of pool/sub-pool distributions with respect to member IP instruments. For example, in one embodiment, an allocation of consortium distribution (CD) to $Pool_j$ is proportional to its membership value/function/weight ($\lambda_j$) in the consortium:

$$\text{Consortium Allocation to Pool}_j = CD \cdot \frac{\lambda_j}{\sum_{over\, i} \lambda_i}$$

In one embodiment, the allocation of CD per pool is determined as to effective time of the distribution. In one embodiment, the allocation of CD per pool is partitioned to intervals associated with the activity resulting in the associated income/revenue distribution, as for example, similarly described in this disclosure. In one embodiment, the allocation of CD is done at activity interval level to the member pools during those intervals. In one embodiment, the allocation to a pool from CD (or a portion of CD associated with an interval) is based on a time average of the membership value/function/weight of the pool within the consortium associated with the effective duration (e.g., the interval), as similarly described in this disclosure. In one embodiment, the allocated portion of CD to a pool is further allocated with respect to the IP instruments within the pool, as for example described in this disclosure.

In one embodiment, the allocation of CD to individual pools is based on the value of the pools. In one embodiment, the membership value/function/weight ($\lambda_j$) of $Pool_j$ in the consortium is based on the pool's value. In one embodiment, $\lambda_j$ is determined based on the size of the pool. In one embodiment, $\lambda_j$ is determined based on market factors (e.g., the type on concerned industry), the type of IP instruments (e.g., business method), the revenue/income generation associated with the pool (and/or IP instruments associated with the pool). In one embodiment, a point/value system is used to track/model the value of the pool, for example similarly to such system/methods described in this disclosure for the IP instruments.

In one embodiment, once a pool is grown to or about or beyond a threshold or critical mass for splitting, it is split in two or more pools (e.g., split n ways). In various embodiments, such a threshold is, for example, on or about $S_{D2}$, (n. $S_{D1}$), or (n. $S_{M1}$) (e.g., see FIG. 7). In one embodiment, the split is done in order the next IP instrument added to a resulting split pool would add a synergistically higher value to the pool (e.g., incrementally or average per IP instrument).

In one embodiment, an access to data is provided to account holders (e.g., assignment beneficiaries) to view and monitor the information regarding their accounts, such as the points/values associated with IP instruments associated with their accounts (and/or historical values), the pools/sub-pools and the membership value/function/weight of such IP instruments in such pools/sub-pools, and/or summary and/or detail info about the distribution events, amounts, and sources associated with those IP instruments. In one embodiment, the access is provided via one or more servers connected to the Internet doing authentication (e.g., user ID and password) in a secure connection (e.g., SSL) and protocol (e.g., HTTPS) with a user's device (e.g., a personal computing device). In one embodiment, the information is presented to the user in dynamic (e.g., server) web pages. In one embodiment, the web servers convert the user actions on the web pages to commands or tags that trigger processes to extract data from backend systems and databases or reporting tools. In one embodiment, the system sends a notification to the user upon triggers configured by or for the user. For example, the user is notified when a distribution is made to an account associated with the user, when there is a change in a point/value of an IP instruments associated with the user's account, and/or when a milestone is reached associated with an IP instrument or a pool (e.g., IP instrument expires, or the pool reaches a critical mass). In one embodiment, such configurable notifications are sent by the system to the user via email, text message, a mail process, electronic alerts, subscription, and/or RSS feed. In one embodiment, investors, members, or partners may have similarly access to data regarding the performance of the pools (e.g., revenue/income generation), financial reports, distribution and/or dividend data. In one embodiment, the parameters governing various models may be configures through user interface by authorized personnel. In, one embodiment, rules, data, models and formulas associated with accounts, value models for IP instruments, and/or pool distributions are accessed by authorized users or administrators. In one embodiment, confidential matters, e.g., the proceed amount (or event/transaction) from a confidential settlement agreement is associated with an attribute indicating confidentiality or a level of confidentiality. In one embodiment, the user is requested to agree to confidentiality terms related to its account before viewing such confidential information. In one embodiment, the record of access to confidential information is recorded in a database. In one embodiment, the provided reports (e.g., containing confidential matters) are protected by a DRM (Digital Rights Management) technology.

In one embodiment, an advance notice (e.g., a 2-month period) of change to a value/weight, rules or rules' parameters, or a model or its parameters is sent to a party (e.g., account holder) in order to give the party to opt out of pool or exercise an option based on the governing contract, for a period of time. In one embodiment, a user opts out by settling an account, for example, settling any incurred accumulated costs and expenses related to the account, including for example, the costs/fees associated with the prosecution the IP instrument, various maintenance fees, legal fees, and/or transaction fees. Such opt out option may be contingent upon approval of an entity such as the pool management.

In one embodiment, a distribution to an account may be after the costs and/or transaction fees associated with such account (e.g., associated with the IP instruments associated with the account) is already reimbursed to the management entity. In one embodiment, for example, first, litigation/direct cost including prior years' cost and accumulated expenses (e.g. prosecution cost and issue fee and maintenance cost); then, the management fees or transaction fees, allocated indirect costs and expenses (e.g. salaries or general expenses) determined for example based on an overhead ratio; then, a percentage (e.g., as fixed percentage) to investors, partners, shareholders (e.g. dividend) is allocated from the revenue/income. Then, bonus as a percentage of the remaining amount with respect to an associated IP instrument is allocated. Then, the remaining amount is allocated for pool(s)/sub-pool(s) distribution. In one embodiment, various transactional fees are associated with various distributions (e.g., bonus and pool distributions), for example, based on the amount of the distribution. For example, a distribution to a pool, may incur a transaction fee proportional to the amount of distribution before incurring the fee and/or having a minimum and/or maximum amount.

Figure 18:
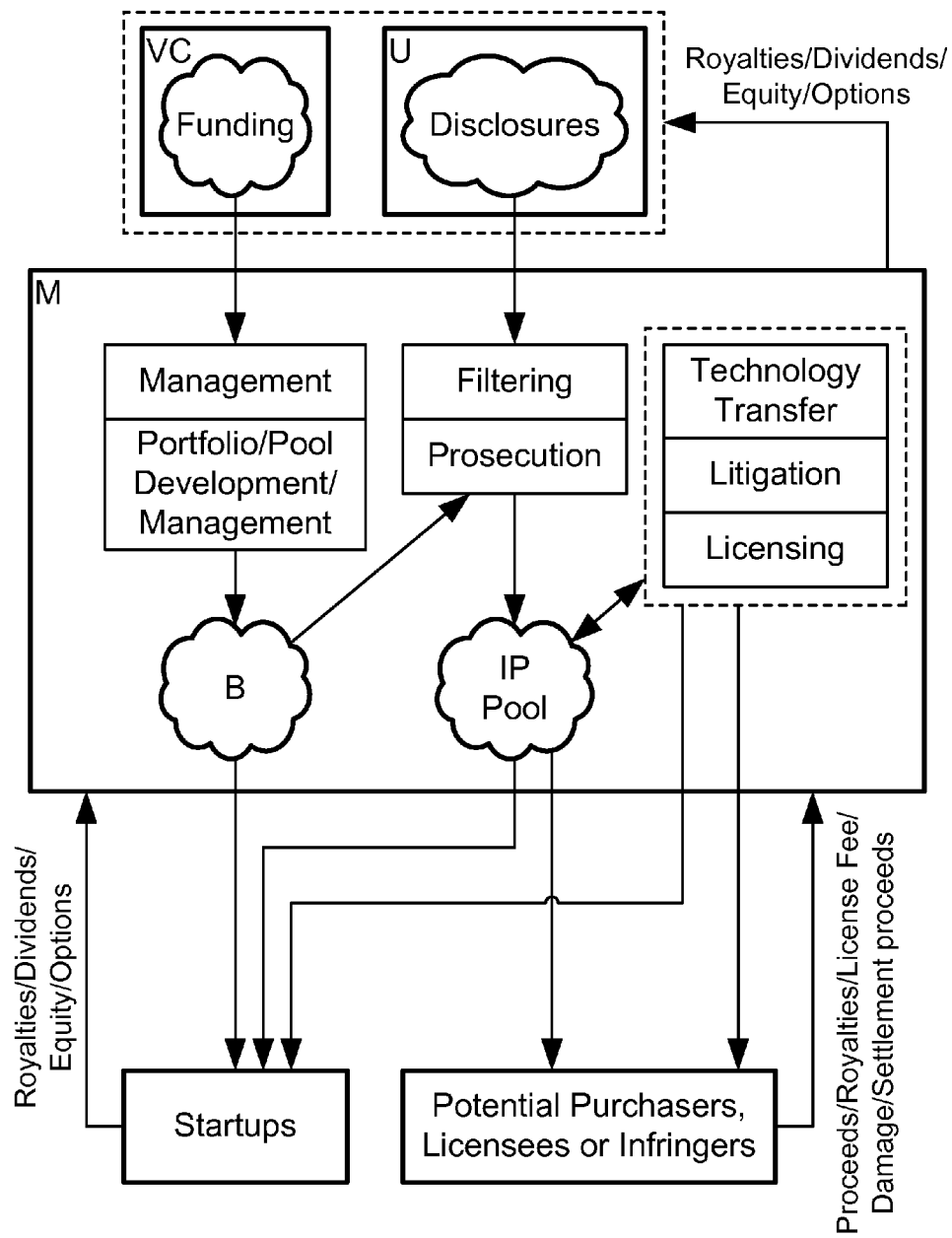
FIG. 18 demonstrates IP management system for working with a disclosure producing entity such as a university and funding source such as a VC, in an embodiment of this invention.

One embodiment of our model or invention is for collaboration with an entity such as a university where for example ideas and applications are generated and developed. FIG. 18 depicts an example of such embodiment. To demonstrate an embodiment on this invention, assume that an IP management firm M desires to collaborate and partner with an entity (such as a university) U. As an example, assume that U receives 100 initial invention disclosures per year, from its researchers or professors within the university, U. Out of those 100 initial disclosures, U normally files 80 applications (or 80 percent) at various patent offices (e.g., USPTO). In one embodiment, (e.g., in the first year) M initially chooses 30 percent of the initial disclosures (e.g., as the first filtering step), or 30 initial disclosures, e.g., according to its market studies and its prior experience or familiarity with the technology, market, or industry, to maximize M's rate of return on investments or overall profit.

In one embodiment, for every initial disclosure that M chooses, M invests an amount, e.g., $100K ($100,000) into a common bucket B (for a total of $3M, in this example). In one embodiment, B is for future use of any or all of these 30 ideas (initial disclosures) chosen, and B stays in an escrow or an account that is, for example, only unlocked or accessed by M and U together or by having both M and U's authorization. In one embodiment, the fund in B can only be withdrawn for use of those 30 initial disclosures, and after signature and approval by both M and U, to certify that it is being used for only that purpose.

In one embodiment, an entity, e.g., M or an M's agent, affiliate, subsidiary, or contractor, files all 30 disclosures as a patent application, e.g., resulting in M having 30 applications for, example, in its first year portfolio. In one embodiment, the Continuation applications, Continuation In Part (CIP) applications, or Divisional applications are covered in the same portfolio, P, e.g., via a contract between U and M. In one embodiment, each year, such process occurs, and P grows in size and value. In one embodiment, the process (e.g., the initial filtering) occurs as the disclosures are prepared. In one embodiment, M seeks an outside funding, e.g., gets a private investor or venture capital (VC), to jump start a faster growth. M, U, and VC share the equity or shares of the companies and/or licensing fees (or other value and income) driven from or based on those (e.g., 30) initial disclosures, e.g., by contract, from a table, schedule, formula, or percentage. In such a collaboration and organization, everyone benefits.

To demonstrate an embodiment, assume that in the prior years before such collaboration and filtering, 10 percent of those ideas became (e.g., a real hi-tech) startup company. Now, with M's expertise involved, and/or filtering done, e.g., by M initially, the success rate for the startup companies based on the chosen disclosures increase, e.g., by 4 times more, or 40 percent success rate. In such example, this would translate to 30×40%=12 new startups for the first year, or per year, instead of only 3 per year. Thus, in such an embodiment, we have the combination of the value of 18 patent applications and 12 new companies, e.g., with corresponding 12 supporting applications, which will become patents in the future (or a family of patents grown from that single application) in the portfolio. This is a huge increase in the value of portfolio per year. In one embodiment, this value will increase with the same rate every year. In one embodiment, such value increase only or primarily due to the larger size, power, funding, man power, and resources provided by M.

To demonstrate an embodiment, as an example, the managing entity or entities such as M decides that it wants to spend $100K for companies 1-10, and $50K for companies 11-12 out of the common bucket B money reserve, for the next 2 years. In one embodiment, M is the only decision maker for this distribution. In this example, the value of portfolio increases even more, per year. In addition, out of, for example, $3M (3 million dollars), initially in bucket B or related to those 30 disclosures, M has spent/used only $1.1M in the startups. Therefore, M still has $1.9M remaining in the bucket B, for the same 30 companies of the first year, or for a fraction of those 30 companies for the next years, or for a combination of all 30 such companies per year added to the main portfolio (cumulative of all years added). In such an embodiment, that will result a higher success rate and value in average or total for the main portfolio. Again, everyone is a winner. In one embodiment, the success rate of the startups are increased due to initial filtering and selection geared toward commercialization, and the infusion of the funds from the bucket to high ranking ideas in the portfolio. By maintaining high quality disclosures and patent portfolios through such filtering and funding process, more opportunities and higher percentage of probability for higher levels of income, value, dividend, cash out, stocks, licensing fees, settlement proceeds, and/or damage recoveries from litigation is expected. For example, a high quality patent is comparably expected to do better in invalidity, non-infringement, or unenforceability challenges.

In one embodiment, the bucket is partitioned (e.g., logically) into multiple accounts or sections. In one embodiment, for example, a portion/section of the bucket is used for prosecution of the patent applications and maintenance issued patents. In one embodiment, a section of the bucket is used for funding startup entities based on licenses from the IP instrument(s). In one embodiment, an infusion of funds into bucket is distributed or allocated into the multiple sections based on assigned or calculated percentages. For example, in one embodiment, the allocation ratio between the IP prosecution and Startup funding is about 1 to 5. In one embodiment, the allocation between the sections of the bucket is based on the ratio of the number of disclosed ideas selected for patent filing and the number of startup entities desired to form based on those related IP. In one embodiment, for example, such ratio is about 40% (e.g., indicating a high ratio of 12 startups out of 30 such disclosures). In one embodiment, the relative allocation of funding between the sections of bucket is calculated, e.g., based on the average cost of patent prosecution and the typical startup funding for successful growth and commercialization. Such typical funding values may be modeled after the funding from SBIR phase I and phase II or a combination. Such allocation between prosecution and startup funding, creates an incentive for the disclosed ideas to be developed and be competed for funding for startup. Such a competition also produces more thorough disclosures that yield higher quality patent applications, even if the disclosure is not ultimately selected as the IP basis in funding a startup.

In various embodiments, the funding allocated in bucket B for startup entities may be distributed uniformly or non-uniformly per startup entities. In one embodiment, factors such as market analysis and/or desired growth rate are used to determine the initial funding level for a startup from bucket B. In one embodiment, such analysis produces a weight percentage or factor for each startup entity to be funded, and the funding from bucket B is allocated to the startup entities based on such weights (e.g., proportionally).

Figure 22:
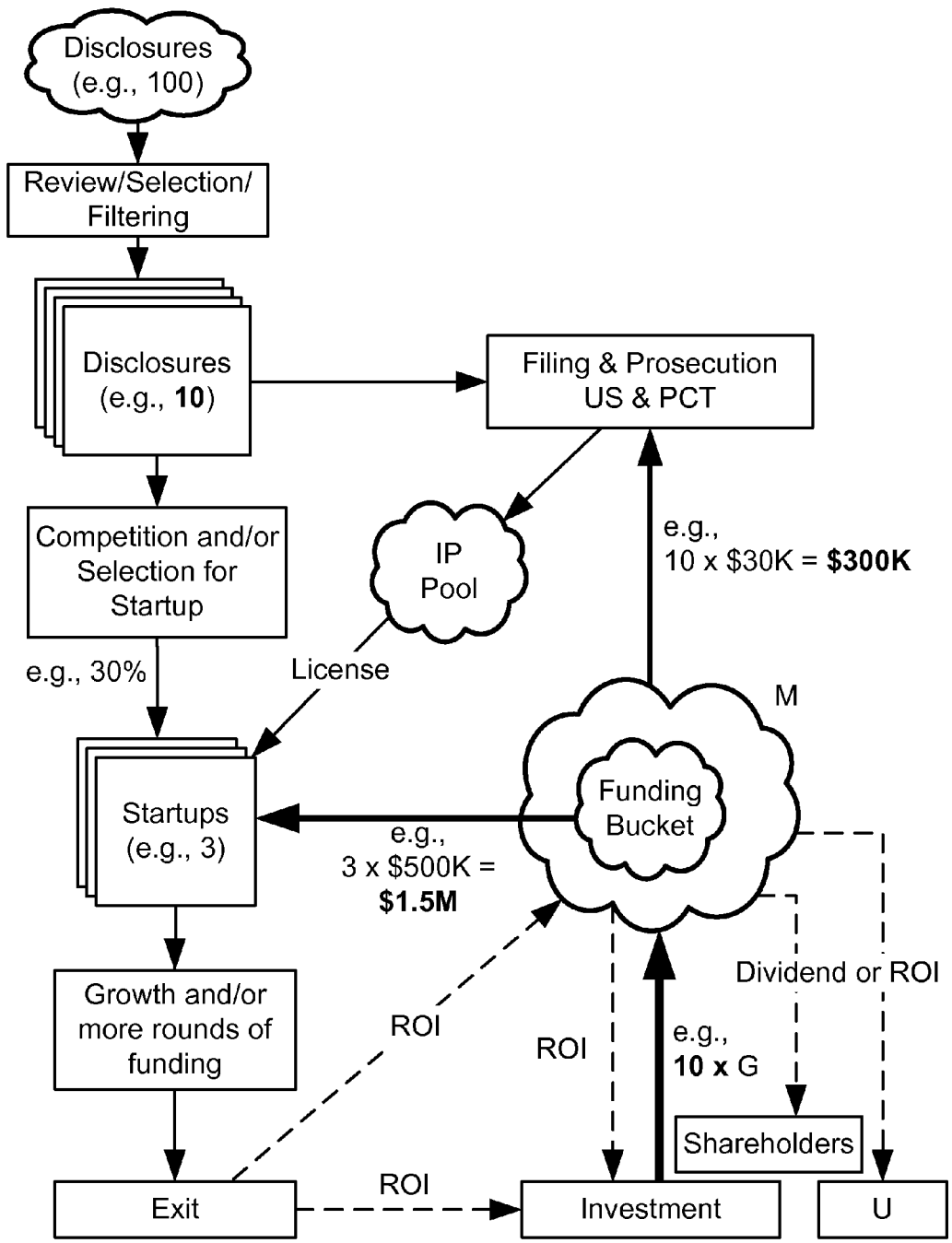
FIG. 22 shows a system for interaction with a university tech transfer office, as an embodiment of the invention.

FIG. 22 shows a system for interaction with a university tech transfer office, as an embodiment of the invention, or for a similar situation. Out of 100 original disclosures, only 10 of them are selected, which are filed in US and as PCT/international case, with cost of about 30K$ per case, producing an IP pool. After further review and passage of time, one (the management of IP portfolio, or M) decides that only 3 cases can (or should or best suited) be selected for a startup company. Others (7 disclosures) are better suited for licensing (or litigation, if required). The startups get a total of 1.5 M$ from (locked or unlocked) funding bucket, distributed in any form to the 3 companies, as M sees fit or proper. The funding bucket is a subset of the general funding for M, which supplies 300K$ prosecution cost, and mainly and originally is supplied by investors (by the amount of 10G). (The locked funding bucket means that it can be only used for the purpose of the startup growths, and nothing else, unless the university agrees otherwise.)

IP pool licenses the startups, which will grow to be sold or raise another round of funding, to eventually do the exit strategy, for return-on-investment (ROI) directly or indirectly to investors, or ROI to the general funding for M, which can be distributed to shareholders of M or university partner with lots of inventors and disclosures, as dividend or ROI.

Figure 23:
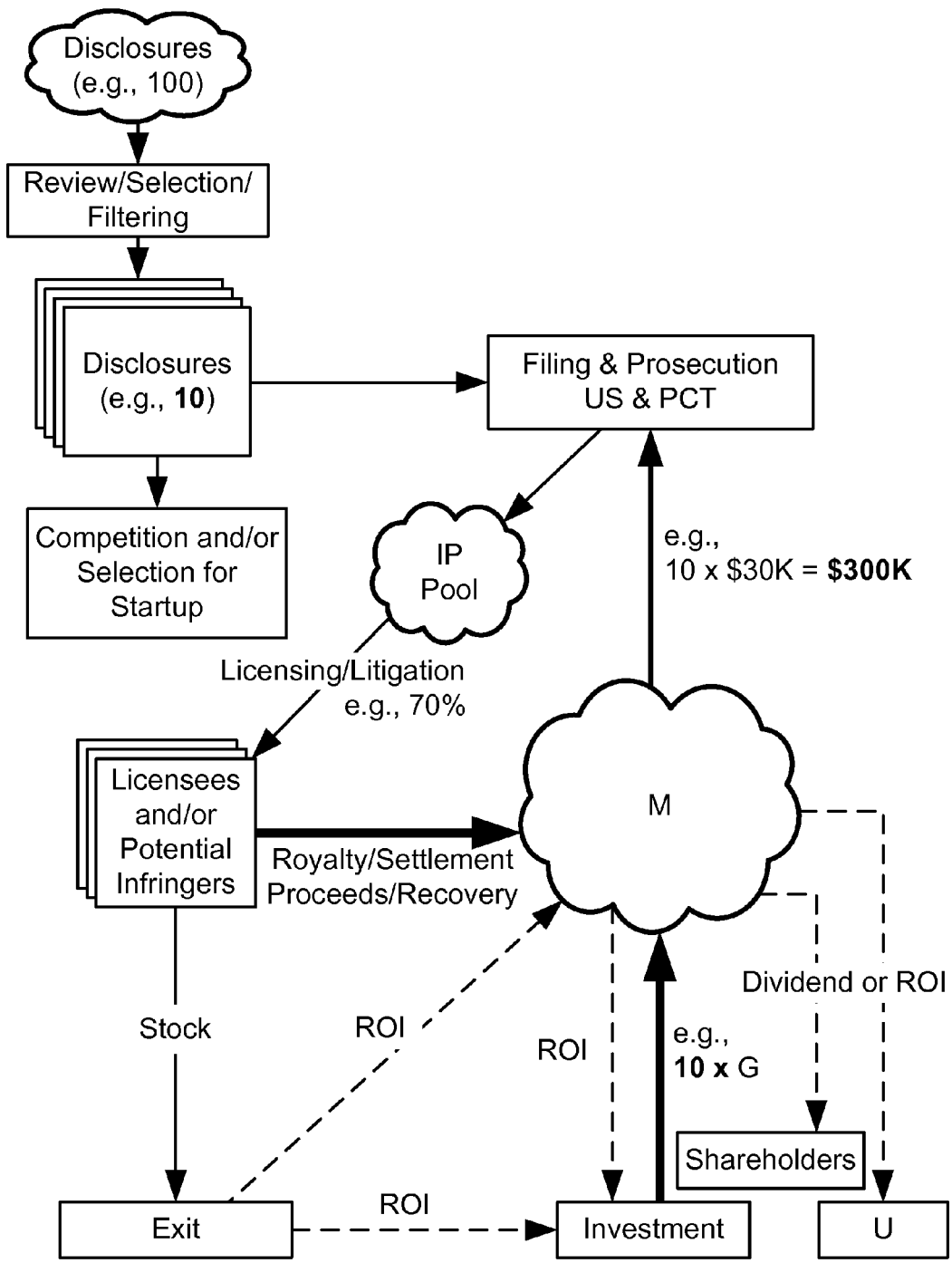
FIG. 23 shows a system for interaction with a university tech transfer office, as an embodiment of the invention.

FIG. 23 shows a system for interaction with a university tech transfer office, as an embodiment of the invention, or for a similar situation, very similar to FIG. 22. However, in the current figure, we deal with 7 licensing cases (as discussed above, for remaining of the 10 original selected disclosures), which produce licensing fees or royalties and stock (generated from the licensees), licensed from IP portfolio/pool. The royalty or settlement proceeding goes directly to general funding for M. The stock received from licensees' companies will become ROI at the exit (e.g. when selling the company and cashing out or selling stocks). The ROI can go directly or indirectly to the investors. The rest of the figure was explained in the previous figure (FIG. 22).

In one embodiment, the IP instruments include patents and patent applications, copyright of works of authorship (e.g., software, books, movies, paintings, architectures, designs), trademark rights (e.g., franchise, labels), proprietary/trade secrets (rights to know-how and/or practice e.g., under nondisclosure), or other IP right or subset thereof. Each category of IP instruments may have their own particular set of rights leading to various tailoring of licensing packages. For example, from patent exclusionary rights, license packages may be arranged as a combination of use, make, sell, and/or import. For example, from Copyright rights, license packages may be arranged as a combination of reproduction, derivative works, distribution, transmission, selling, display or performance, and various digital usage (e.g., viewing, printing).

In one embodiment, one charges a fee for a member, per month or year, as an example, as insurance for defense, in case a member is a defendant in an IP litigation, by a third party plaintiff, using one or more patents/IPs owned or used by the third party. Then, the patent pool or consortium will be obligated to help defend the member using all of the patents or IPs in the pool, or using the IP owned by another party. In one embodiment, the member can be contributor to the pool, as a patent holder, which also gets a part of the money it pays in for insurance back, as the pool contributor (similar to a shareholder in this process or transaction). In one embodiment, the member is not a contributor to the pool, as a patent holder.

In one embodiment, if a company joins in as a pool contributor or as an insurance holder, as described above, the pool management company shall mandate, e.g. by contract, that all the IP owned by the company will be used for the defense of other pool contributors or insurance holders, by the pool management company. Or, alternatively, the IPs owned by the company cannot be used offensively against any of the other pool contributors or insurance holders, as long as they stay as members as pool contributors or insurance holders.

For the same reason, as having good influence in the market or industry, in one embodiment, by contract, one consent to the binding arbitration by the pool management company, for members in pool or insurance, or both, or any third party later consenting to such a process, to avoid cost of litigation at court, to be substituted by fair and knowledgeable review of the pool judge or panel of judges, selected by or within the pool management company, or from outside the pool management company, which has a lot of knowledge and resources, and keeps the impartiality to continue this process for others in future, as more volunteers joining in this process, as members or third parties, just for this purpose. The arbitration in another embodiment is optional or non-binding.

For the same reason, as having good influence in the market or industry, with a lot of credibility, in one embodiment, the pool management company shall set up an index(es) and point system(s) for value of a patent, IP, portfolio, company, technology, weighted average, average, historical analysis, statistical analysis, market analysis, IP analysis, patent office analysis, case or decision analysis from the courts, industry analysis, or sector analysis, for members, non-members (for a fee with a report), government, or others, similar to Dow Jones or NASDAQ indices or parameters, as the indication for performance or value, for economy, industry, individual IP, company, or IP portfolio, or others, which is a valuable service and authority to look up to, for all. For example, an average value of an IP instrument is used an index for the pool associated with that type of IP instrument.

Figure 19:
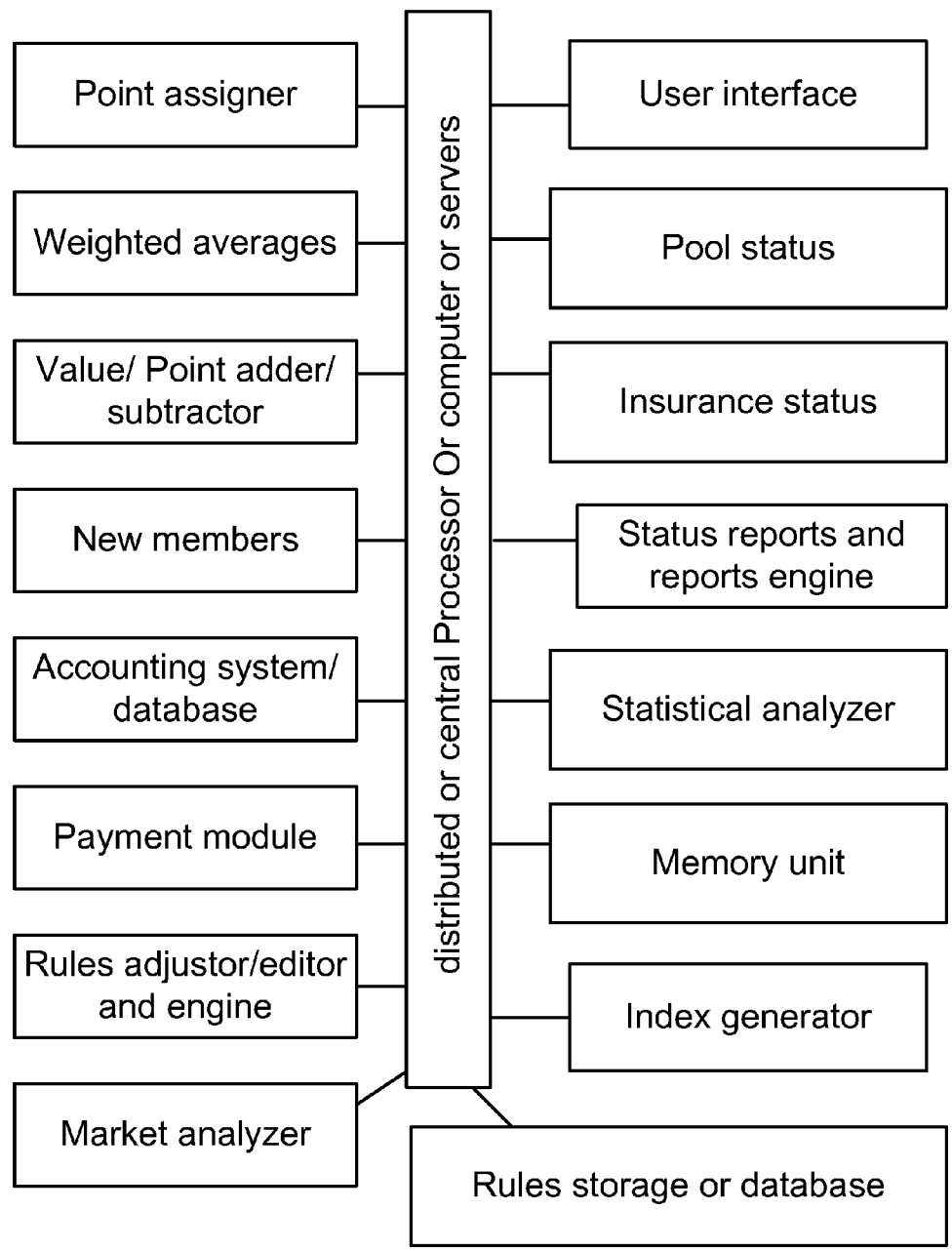
FIG. 19 shows a system of an embodiment of the invention.

FIG. 19 shows a system (of modules) of an embodiment of the invention, in which a computer, server, microprocessor, central controller, or processor controls everything globally or locally or remotely. The points are assigned to each member or IP/patent, by point assigner. The averages are calculated. The points are added for each section, portfolio, patent, IP, pool, sub-pool, subset pool, superset pool, main pool, combined pools, or averages, by point adder. New members are evaluated and added, with corresponding accounting, including charges, payments, installments, benefits, distributions, weights, points, values, or percentages, per pay period, or monthly, daily, weekly, or as often as needed.

The payment module sends the checks or money to the rightful owners, based on accounting module. Market analyzer analyzes the current situation, and adjusts the rules by rules adjustor, and updates them in rules database. The information in various modules are stored in one or more memory units or storages. The index generator(s) (e.g. for economy and IP, similar to NASDAQ indices), such as Relative Patent Value Index, for value of a specific patent in a context or at a given time, relative to others, in industry or a pool, is based on the e.g. pool status and content. The statistical analyzer analyzes the status of the insurance and pools, to generate status reports, for internal or external usages/distribution (or sales). The user interface or GUI makes the user connected and aware of the indices or averages, or any progress or status reports, related to industry or his/her personal portfolio value, or pool participation and performance, or past history and analysis, at any given time, 24 hours a day. This is similar to the stock market and tools available, for encouraging more participation by the members or third parties in this process or IP pooling activities.

Figure 20:
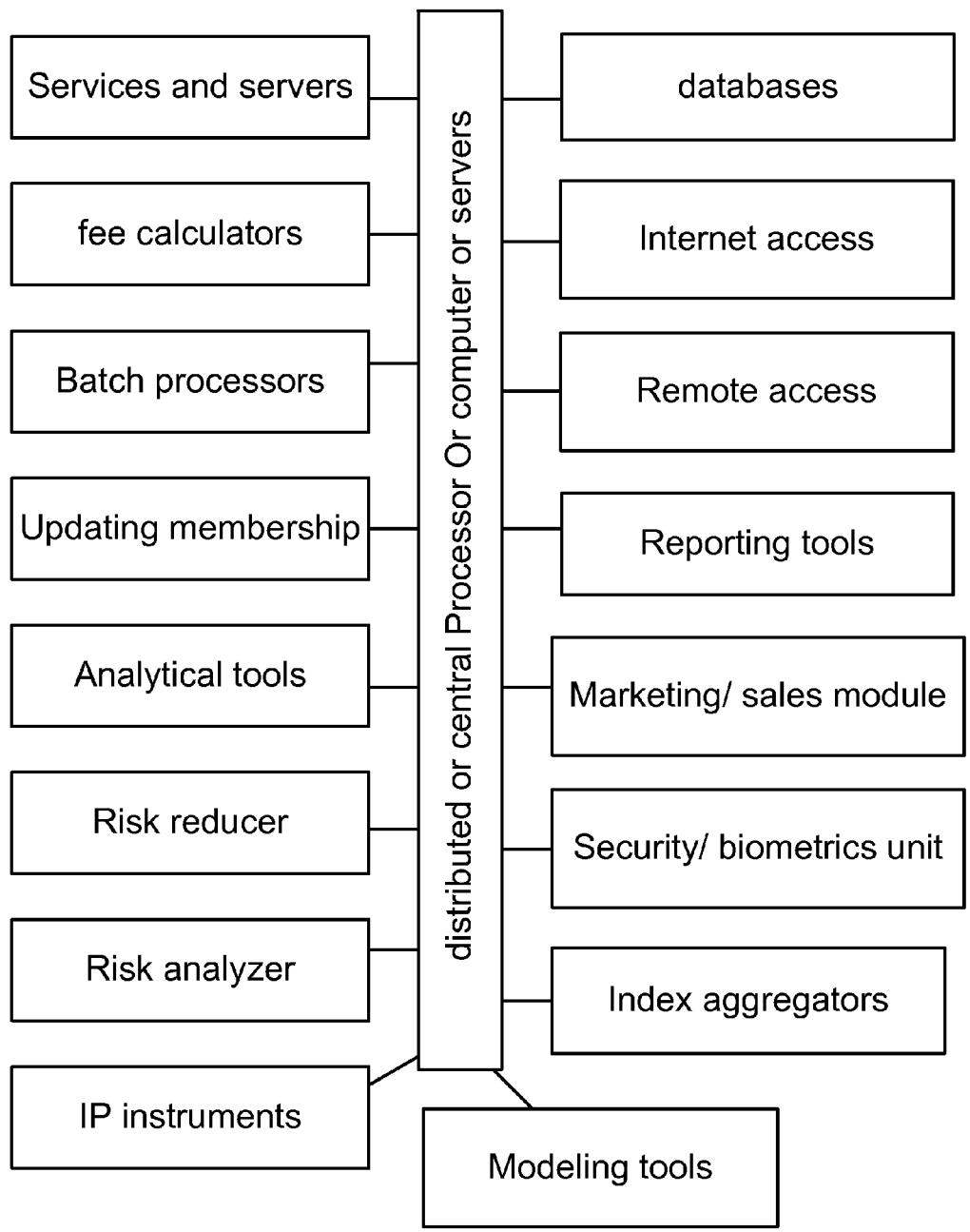
FIG. 20 shows a system of an embodiment of the invention.

FIG. 20 shows the system (of modules) with multiple processors or servers, with supporting databases, with Internet or remote access, with reporting tools and marketing/sales modules, as an embodiment of the invention. In one embodiment, the system has a security/biometric modules. In one embodiment, the system aggregates indices for reports or analysis, using model tools, curves, tables, history, or databases, for all IP instruments, e.g. for risk analysis (by risk analyzer), e.g. to reduce risk (by risk reducer). Other analytical tools are also used to supplement the analysis and point/value assignment to portfolios, IPs, subsets, or pools. The batch processors do the updating and refreshing for databases and the whole system, e.g. for updating memberships in insurance or pooling systems, and recalculating the new points and relative values, to fairly reassign and calculate the benefits and fees for all parties involved, at any given time, or aggregate those values for the whole time period, for actual payments at the end of time period (by fee/percentage/benefits calculators).

Figure 21:
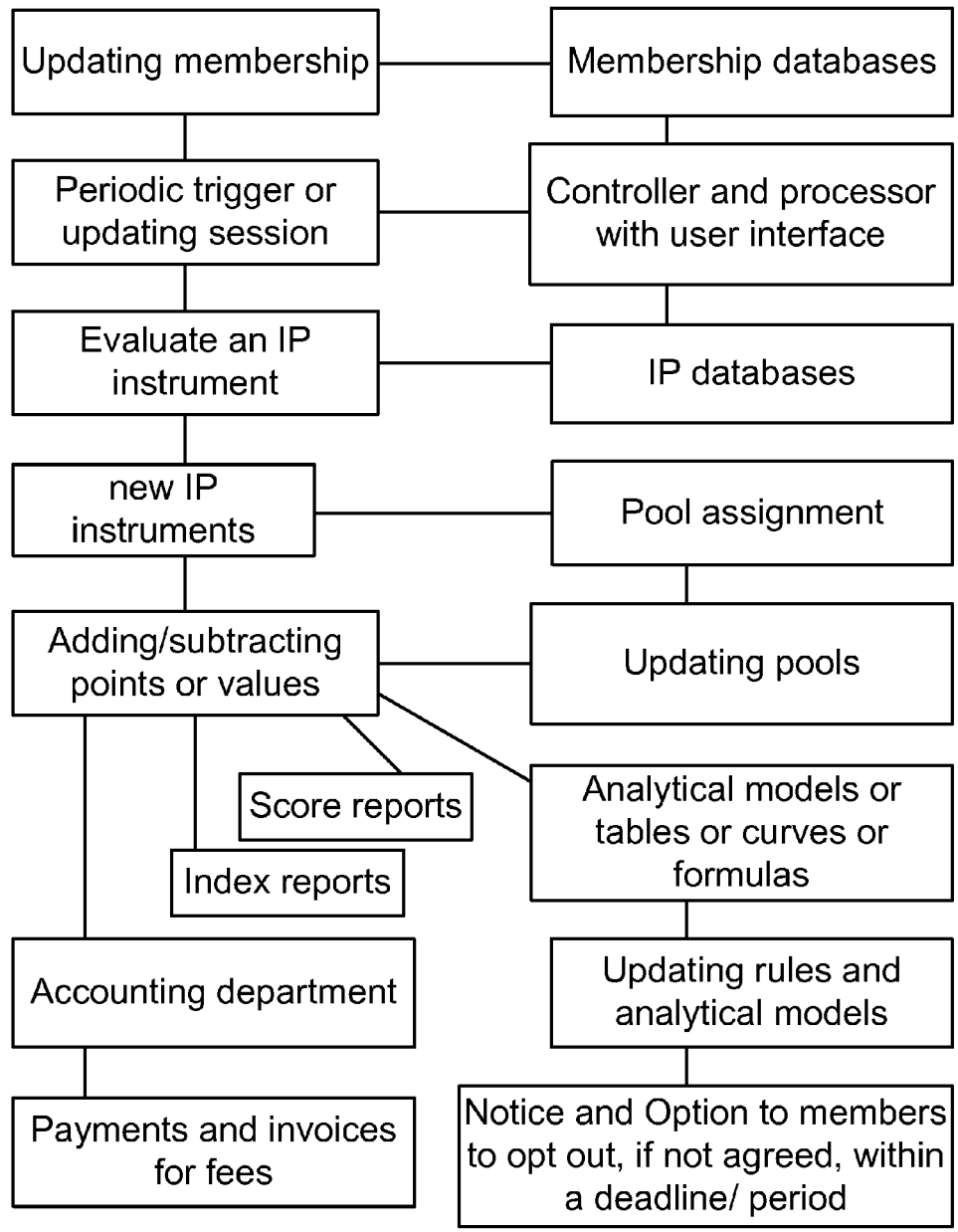
FIG. 21 shows an updating system of an embodiment of the invention.

FIG. 21 shows a system (of modules) of updating, as an embodiment of the invention, with a controller(s) and processor(s), plus user interface or GUI (graphical user interface). The controller(s) and processor(s) are connected to various databases (or storages or memory units). The membership database feeds into the updating membership module, which is triggered to update, based on the updating module, which is controlled by the controller or central processor or microprocessor(s) (distributed or centrally positioned). The IP databases feed in to the IP evaluation module, which based on the updating module, at some periods of time, evaluates the IP instruments (which are continuously fed by the new IP instruments module, as the admission or gateway for new IP arrival and filtering, to be admitted or filtered into the system).

The new IP instruments module includes some filters, based on the computers based on analytical models, or human as IP experts or analysts, based on some criteria, for admission or classification or quality or scope or type or admissibility or industrial usage or pool designation, for that IP instrument. The new IP instruments module also feeds into the pool assignment module, which feeds into the updating pool module. The updating pool module and the IP evaluation module are connected to the point assignor/adder/subtractor module, for the IP instruments, which generates score reports or index reports (similar to Dow Jones Industrial Average (Dow Jones Indices)).

The updating rules and analytical models/tables/formulas module updates the analytical models module, which is connected to the point assignor/adder/subtractor module, which feeds into the accounting module, which generates payments or invoices for people or companies for fees or charges (through payment module and invoicing module), and keeps track of all transactions and accounts receivable and payable (through transaction module). In addition, in one embodiment, the updating rules and analytical models/tables/formulas module sends notification to people, companies, members, or thirds parties, through the notification module, to inform them about the changes on rules and parameters, with a grace period for them to opt-out of the membership and system, or agreement, if they do not agree on the changes, e.g. 2-month notice/deadline, so that the changes are not retroactive, and the agreements are renewed, with the new amendments and additions, with the complete agreement and acknowledgements of the users and members. This makes the new agreement enforceable and binding on all parties. Of course, if the agreement is not reached, and it gets terminated, the remaining balance for the user or member will be paid as usual, on a periodic basis, to close the account for that member or user, who wished to opt-out of the system under the new rules.

In one example, if an issued patent has a pending Continuation still under review at the patent office, the score is higher. The score is also higher for a jumbo patent, with multiple inventions. The priority date affects the score for a patent: The older the priority date, the higher the score.

In one embodiment, we have a system for managing and scoring a pool of intellectual property instruments, which comprises: a score assigner to assign scores to each one of intellectual property instruments associated with a pool; one or more memory storage units to store said assigned scores; a microprocessor or controller which accesses said one or more memory storage units (to get or put data in it); an allocator to assign or distribute a pool distribution amount (such as income and licensing fees collected) among one or more of said intellectual property instruments associated with said pool, based on said assigned scores within said pool (as a relative or absolute score number, to give each a fair share); and one or more accounting records to store said assigned pool distribution (stored in the accounting database or servers); wherein said one or more accounting records are associated with one or more of said intellectual property instruments (and also associated with one or more beneficiaries, e.g. individuals owning the patents in the pool, or their heirs or assignees).

In one embodiment, we have a system for managing and scoring a pool of intellectual property instruments, which is similar to the above example, except that we have an intellectual property score database to store scores for each one of intellectual property instruments associated with a pool, instead of assigning the score by score assigner.

In one embodiment, we have a system for managing and scoring a pool of intellectual property instruments, which comprises: one or more event record units (e.g. a database) associated with one or more specific events or transactions (such as allowance of an application); a processor or controller which accesses said one or more event record units (for accessing the information); one or more intellectual property records associated with intellectual property instruments associated with a pool (e.g. a database); an intellectual property score updater to update a intellectual property score associated with an intellectual property instrument associated with said pool, based on said one or more specific events or transactions and one or more rules (e.g. increasing the score after allowance of an application); wherein said one or more specific events or transactions correspond to one or more of said intellectual property instruments associated with said pool (e.g. related to one or more applications in a pool); and one or more memory units to store said updated intellectual property score (such as a database).

In one embodiment, we have a method for managing and scoring a pool of intellectual property instruments on a computer system, which comprises: assigning a score to an intellectual property instrument within a pool (by an initialization module, which assigns the score for the first time for the new incoming IPs); storing said score in a memory location in said computer system (such as a database); an updater updating said score (e.g. add or subtract from the original score, to adjust for the new relative or absolute value, e.g. after the allowance of the application) in said memory location, based on one or more specific events or transactions and one or more rules (e.g. after the allowance of the application) stored in a database, within said computer system or accessed by said computer system; allocating a pool distribution amount among one or more of intellectual property instruments associated with said pool, based on said updated score (distribute the licensing income, based on the relative or absolute weights or scores or points); associating said allocated pool distribution amount with one or more accounting records, and also associating with one or more beneficiaries, e.g. those who own the patents in the pool, and who receive the money, e.g. at the end of the month or quarter.

In one embodiment, we have a system with a rule adjustor, rule editor, and rule engine, to change the rules. In one embodiment, we have a system with a market, intellectual properties, pool, or industry index generator, to characterize or analyze the pool or industry. The system may have a user interface or graphical user interface, e.g. to input data by the user. In one embodiment, we have a system with the insurance status module, for reporting and analyzing status of members or users participating in insurance protection using the pool. In one embodiment, we have a system with the batch processors and batch updaters, for updating e.g. the databases and membership lists. In one embodiment, we have a system with the analytical tools, modeling tools, or prediction tools, to better score the application at different stages of the patent process. In one embodiment, we have a system with the pool assignment module to assign new intellectual property instruments to one or more pools, based on a set of criteria, e.g. the technology or field of invention.

In one embodiment, we have a system with the point adder-and-subtractor to subtract or add points to the scores (or a point assigner or bonus assigner, to adjust for relative increase or decrease of the value of the specific application, e.g. after allowance, it increases the value). In one embodiment, we have a system with the pool status module to analyze, report, remove, or delete all expired, useless, or withdrawn intellectual property instruments from the pool's database, to better evaluate the pool value. In one embodiment, we have a system with the membership updating module, to exactly track the members or users and their IP contributions. In one embodiment, we have a system with the new intellectual property instruments evaluation module, including filtering module for evaluating, accepting, or rejecting new intellectual property instruments for the pool, to keep the quality high for the IPs in the pool.

In one embodiment, we have a system with the score updater to update said scores associated with one or more of said intellectual property instruments associated with said pool, based on a factor related to time variable, effective time, duration of time, or trigger time, e.g. reducing the value of a patent based on time passage, as it gets closer to the end of its lifetime.

In one embodiment, we have a pool is added as a complete or partially complete package, to our pool, with all scores intact, as a package, or all scores scaled or normalized by a fixed number, to reduce the effort to assign scores to a large number of the new incoming patents, for permanent scoring, or sometimes for temporary purposes, until there is a chance to update those scores for a large pool added to our pool.

In one embodiment, we have an IP (intellectual property) added at a point of time to the pool, but the effect of that is time-averaged going back in time, for a period of time, or distributed in an interval of time. In one embodiment, we have a system with automation of all processes, as described here, by computer(s).

Any variations of the above teaching are also intended to be covered by this disclosure.

The invention claimed is:

1. A system for managing and scoring a pool of intellectual property instruments, said system comprising:
a first one or more memory locations holding information about a first pool of intellectual property instruments;
a score assigner to assign a first score to a first one of intellectual property instruments associated with said first pool of intellectual property instruments;
a second one or more memory locations holding information about an event;
a third one or more memory locations holding information about a transaction;
a fourth one or more memory locations holding information about a time model;
a fifth one or more memory locations holding information representing a specific time;
wherein said first score is based on said time model and one or more of said specific time, said event, and said transaction;
a score updater;
wherein said score updater is triggered based on one or more of said event, said transaction, and said specific time;
said score updater updates said first score to a second score;
a sixth one or more memory locations holding information about said second score;
a processor or controller which accesses said sixth one or more memory locations to get said second score;
an allocator to assign a pool distribution amount among members of said first pool of intellectual property instruments, based on said second score; and
one or more accounting records to store said assigned pool distribution;
wherein said one or more accounting records are associated with one or more members of said first pool of intellectual property instruments; and
wherein said one or more accounting records are associated with one or more beneficiaries.

2. The system for managing and scoring a pool of intellectual property instruments as recited in claim 1, wherein said specific time is current time.

3. The system for managing and scoring a pool of intellectual property instruments as recited in claim 1, wherein said specific time is a future time.

4. The system for managing and scoring a pool of intellectual property instruments as recited in claim 1, wherein said specific time is a past time.

5. The system for managing and scoring a pool of intellectual property instruments as recited in claim 1, wherein said specific time is a time interval.

6. The system for managing and scoring a pool of intellectual property instruments as recited in claim 1, wherein said allocator assigns said pool distribution amount among members of said first pool of intellectual property instruments based on said first score.

7. The system for managing and scoring a pool of intellectual property instruments as recited in claim 1, wherein a project or activity is associated with one or multiple members of said first pool of intellectual property instruments.

8. The system for managing and scoring a pool of intellectual property instruments as recited in claim 1, wherein said score updater uses data from a docketing system or database.

9. The system for managing and scoring a pool of intellectual property instruments as recited in claim 1, wherein said score updater uses a status of an intellectual property instrument.

10. The system for managing and scoring a pool of intellectual property instruments as recited in claim 1, wherein said system uses a membership function or membership of an intellectual property instrument in a pool or a sub-pool.

11. The system for managing and scoring a pool of intellectual property instruments as recited in claim 1, wherein said system uses an overridden value.

12. The system for managing and scoring a pool of intellectual property instruments as recited in claim 1, wherein said system uses a weight for said allocator.

13. The system for managing and scoring a pool of intellectual property instruments as recited in claim 1, wherein said system allocates a bonus to an intellectual property instrument or a sub-pool.

14. The system for managing and scoring a pool of intellectual property instruments as recited in claim 1, wherein said system comprises a rule adjustor, rule editor, or rule engine.

15. The system for managing and scoring a pool of intellectual property instruments as recited in claim 1, wherein said system comprises a market, intellectual properties, pool, or industry index generator.

16. The system for managing and scoring a pool of intellectual property instruments as recited in claim 1, wherein said system comprises a batch processor or a batch updater.

17. The system for managing and scoring a pool of intellectual property instruments as recited in claim 1, wherein said system comprises a point adder or a point subtractor to add or subtract points or value, respectively, to said second score.

18. The system for managing and scoring a pool of intellectual property instruments as recited in claim 1, wherein said system comprises a pool status module to analyze, report, remove, or delete an expired, useless, or withdrawn intellectual property instrument from said first pool of intellectual property instruments.

19. The system for managing and scoring a pool of intellectual property instruments as recited in claim 1, wherein said system uses a value boosting factor.

20. A system for managing and scoring a pool of intellectual property instruments, said system comprising:

a first one or more memory locations holding information about a first pool of intellectual property instruments;

a score assigner to assign a first score to a first one of intellectual property instruments associated with said first pool of intellectual property instruments;

a second one or more memory locations holding information about an event;

a third one or more memory locations holding information about a transaction;

a fourth one or more memory locations holding information about a time model;

a fifth one or more memory locations holding information representing a specific time;

wherein said first score is based on said time model and one or more of said specific time, said event, and said transaction;

wherein said score assigner comprises a score updater;

wherein said score updater is triggered based on one or more of said event, said transaction, and said specific time;

said score updater updates said first score to a second score;

a sixth one or more memory locations holding information about said second score;

a processor or controller which accesses said sixth one or more memory locations to get said second score;

an allocator to assign a pool distribution amount among members of said first pool of intellectual property instruments, based on said second score; and one or more accounting records to store said assigned pool distribution;

wherein said one or more accounting records are associated with one or more members of said first pool of intellectual property instruments; and wherein said one or more accounting records are associated with one or more beneficiaries.

* * * * *